United States Patent
Annapragada et al.

(10) Patent No.: US 9,064,031 B2
(45) Date of Patent: Jun. 23, 2015

(54) ADVANCEMENTS IN DATA DISTRIBUTION METHODS AND REFERENTIAL INTEGRITY

(71) Applicant: Tesora, Inc., Cambridge, MA (US)

(72) Inventors: Mrithyunjaya Annapragada, Bolton, MA (US); Douglas A. Shelley, Oakville (CA); Duk Loi, Richmond Hill (CA); Benjamin Rousseau, Somerville, MA (US)

(73) Assignee: Tesora, Inc., Cambridge, MA (US)

( * ) Notice: Subject to any disclaimer, the term of this patent is extended or adjusted under 35 U.S.C. 154(b) by 0 days.

(21) Appl. No.: 14/150,056

(22) Filed: Jan. 8, 2014

(65) Prior Publication Data

US 2014/0214894 A1     Jul. 31, 2014

Related U.S. Application Data

(63) Continuation of application No. 13/966,980, filed on Aug. 14, 2013, now Pat. No. 8,938,472.

(60) Provisional application No. 61/757,809, filed on Jan. 29, 2013.

(51) Int. Cl.
  *G06F 17/30* (2006.01)

(52) U.S. Cl.
  CPC .... *G06F 17/30979* (2013.01); *G06F 17/30463* (2013.01); *G06F 17/30466* (2013.01); *G06F 17/30545* (2013.01); *G06F 17/30289* (2013.01); *G06F 17/30864* (2013.01); *G06F 17/30595* (2013.01)

(58) Field of Classification Search
  CPC .................. G06F 17/30864; G06F 17/30979
  USPC ........................... 707/737, 770, 769
  See application file for complete search history.

(56) References Cited

U.S. PATENT DOCUMENTS

| 7,818,349 | B2 | 10/2010 | Frost |
| 8,219,550 | B2 | 7/2012 | Merz |
| 2004/0083475 | A1 | 4/2004 | Todd |
| 2011/0041006 | A1 | 2/2011 | Fowler |
| 2012/0066020 | A1 | 3/2012 | Moon |

OTHER PUBLICATIONS

"Polymorphism." Merriam-Webster.com. Merriam-Webster, n.d. Web. Aug. 7, 2013. <http://www.merriam-webster.com/dictionary/polymorphism>., 3 pages.
Hierarchical clause. IBM Informix, http://pic.dhe.ibm.com/infocenter/idshelp/v117/topic/com.ibm.sqls.doc/ids_sqs_2033.htm., Oct. 2012, 5 pages.
Parallel Query Execution in PRISMA/DB. Wilschut and Apers. In proceedings of PRISMA Workshop on Parallel Database Systems (1990), 4 pages.
Object Placement in Parallel Object-Oriented Database Systems, Ghandeharizadeh, Whlhite, Lin, Zhao, USC Los Angeles, 1994., 31 pages.

(Continued)

*Primary Examiner* — Huawen Peng
(74) *Attorney, Agent, or Firm* — Cesari and McKenna, LLP

(57) ABSTRACT

An elastic parallel database system where data distribution is container- and container-context based. Container Based Tables are defined and Container Member Tables achieve co-location of data as needed. A polymorphic key may also establish polymorphic key relationships between rows in one table and rows in many other possible tables.

24 Claims, 35 Drawing Sheets

A multi-client SaaS Database showing database creation

(56) References Cited

OTHER PUBLICATIONS

On Multi-column Foreign Key Discovery, Zhang, Hadjieleftheriou, Procopiuc, Ooi, and Srivastava, VLDB 2010, vol. 3, No. 1., 10 pages.

Federated database systems for managing distributed, heterogeneous, and autonomous databases, Sheth, Larson, ACM Computing Surveys, 1990., 54 pages.

A comparative analysis of methodologies for database schema integration, Batini, Lenzerini, Navathe, ACM 1987, 0360-0300/86/1200-0323, 42 pages.

PostgreSQL Documentation, Chapter 5.8 Inheritence. http://www.postgresql.org/docs/9.0/static/ddl-inherit.html, 1996, 4 pages.

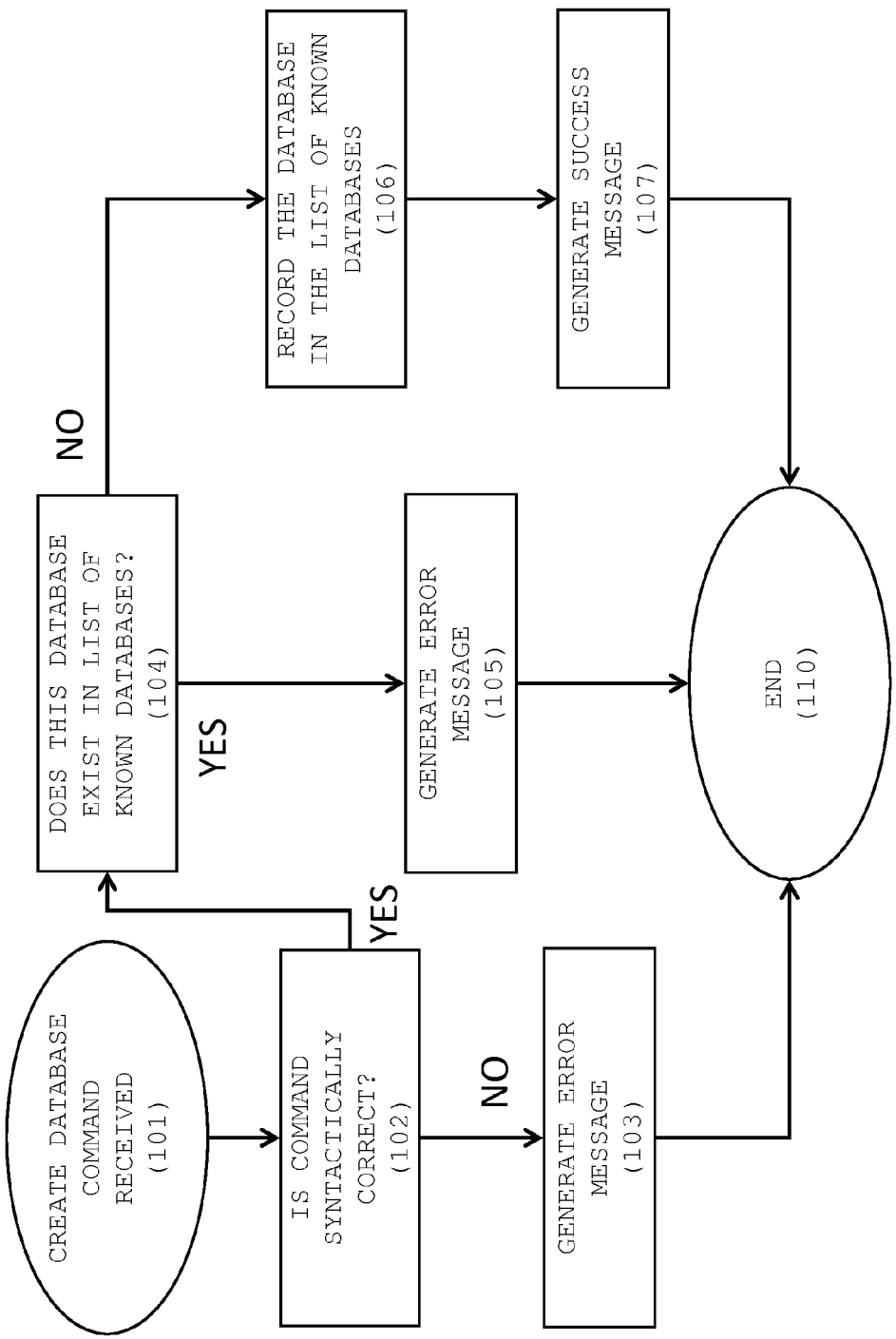
Figure 1. A multi-client SaaS Database showing database creation

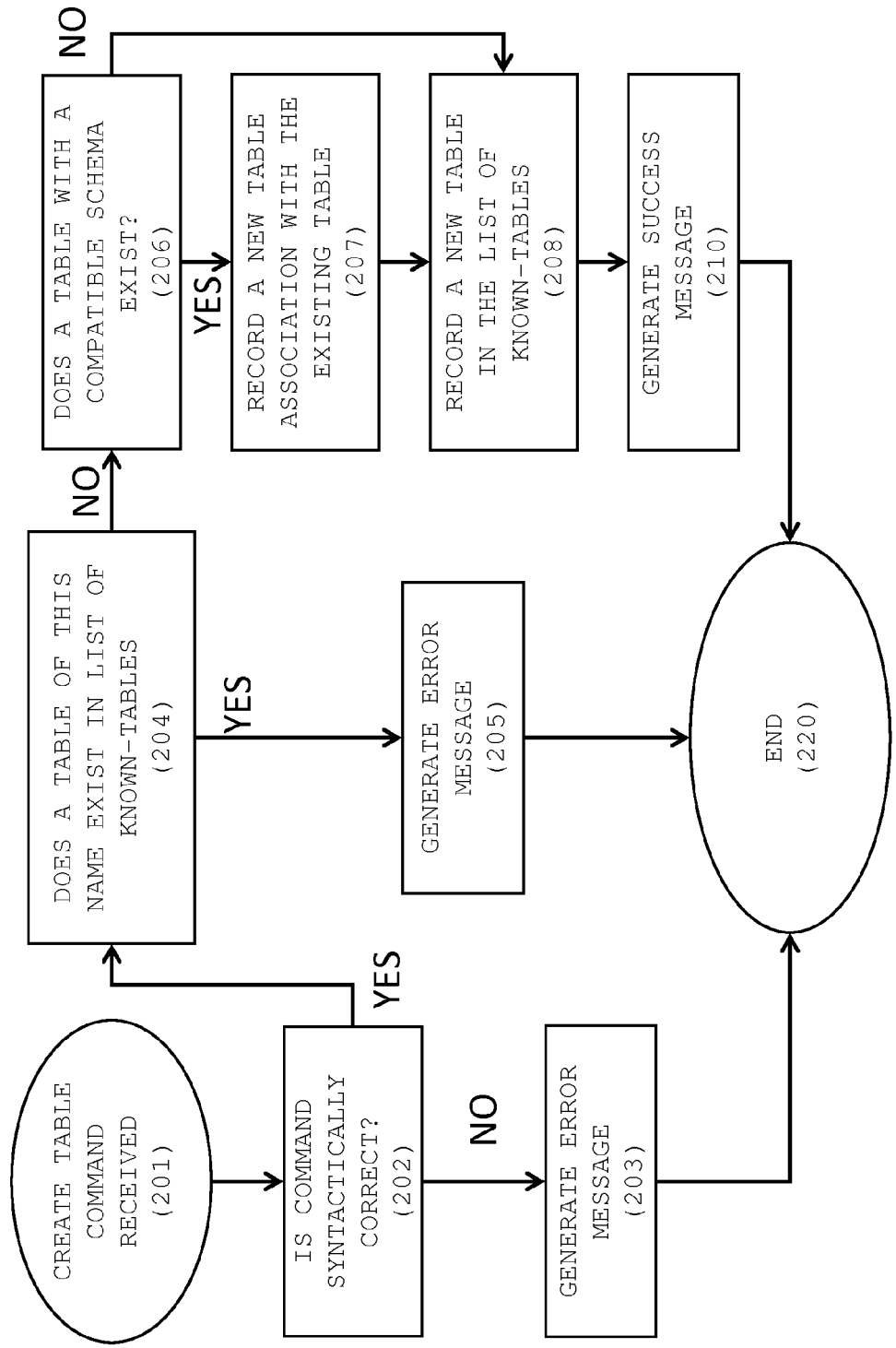
Figure 2. A multi-client SaaS Database showing table creation

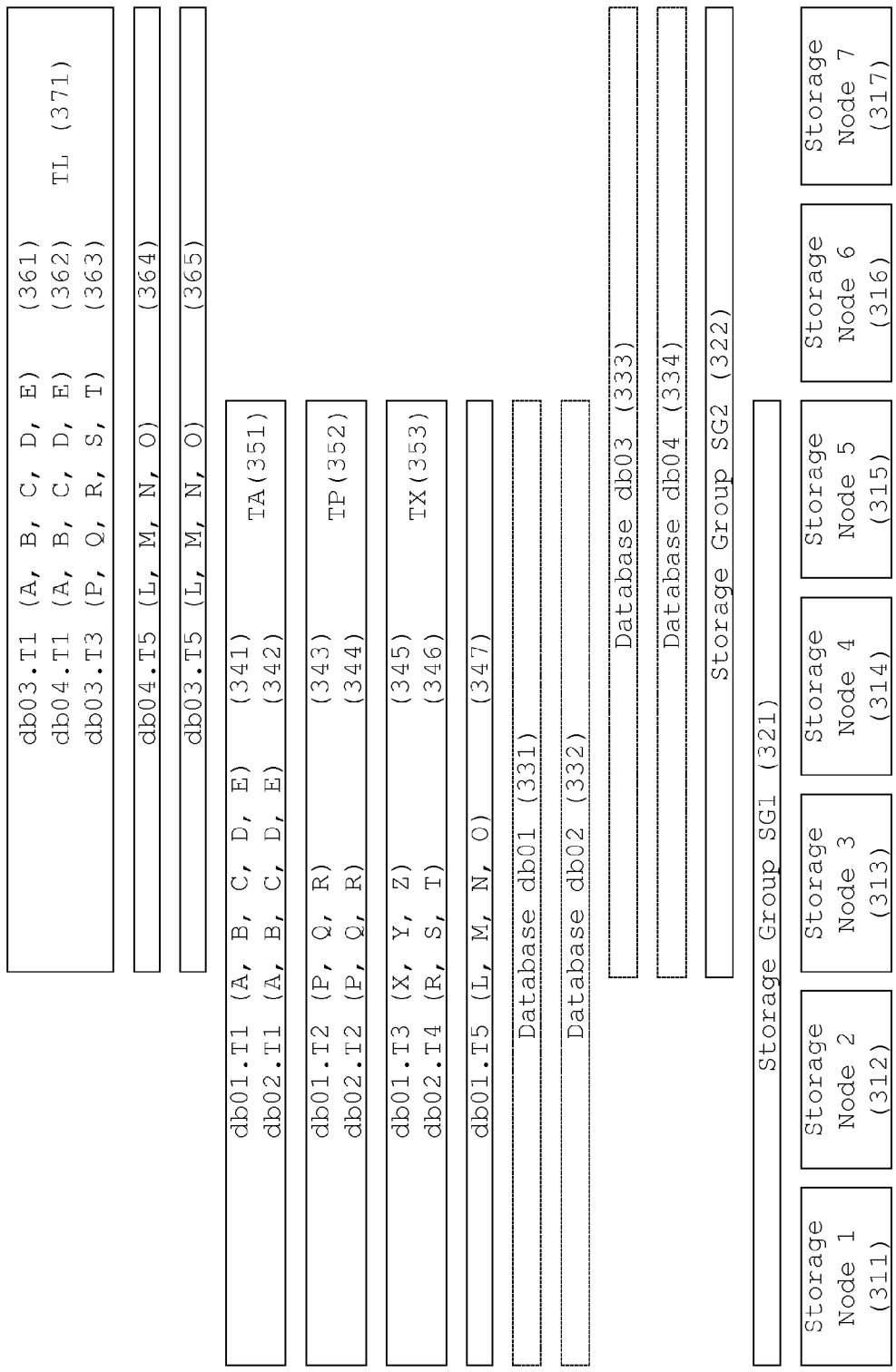
Figure 3: A multi-client SaaS database

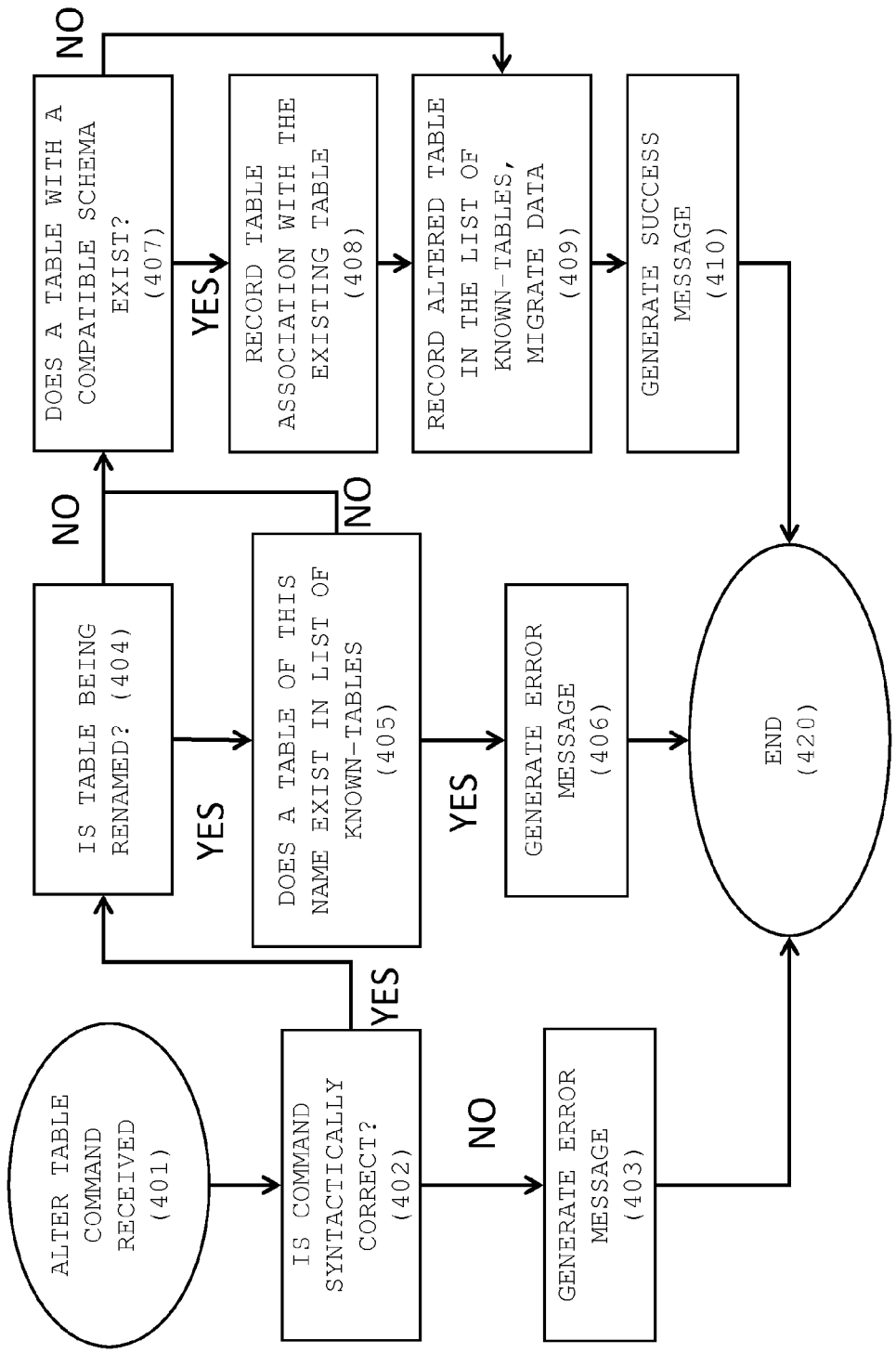
Figure 4. A multi-client SaaS Database showing table alteration

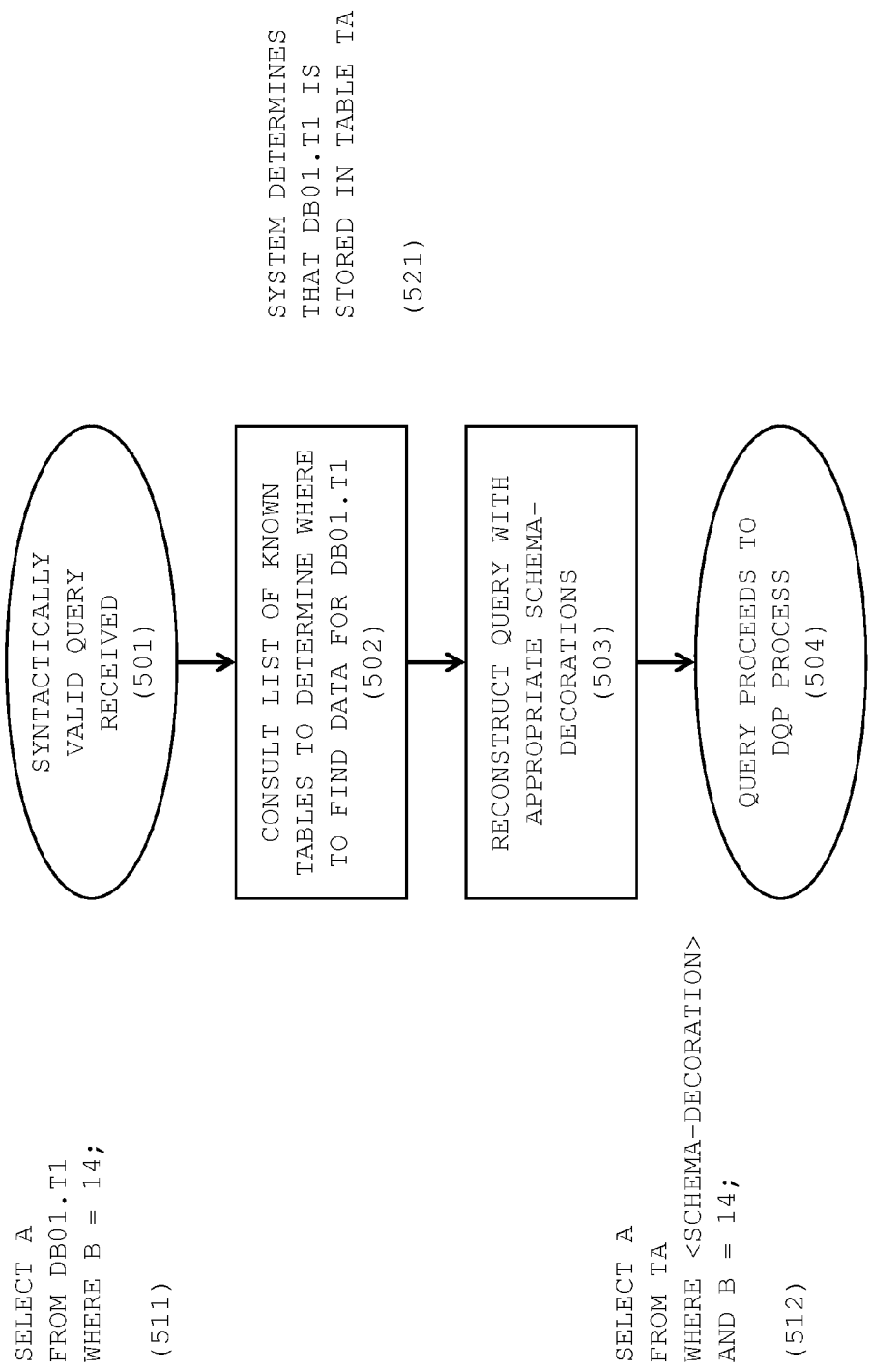
Figure 5. A multi-client SaaS Database showing a query and filters based on schema-decorations

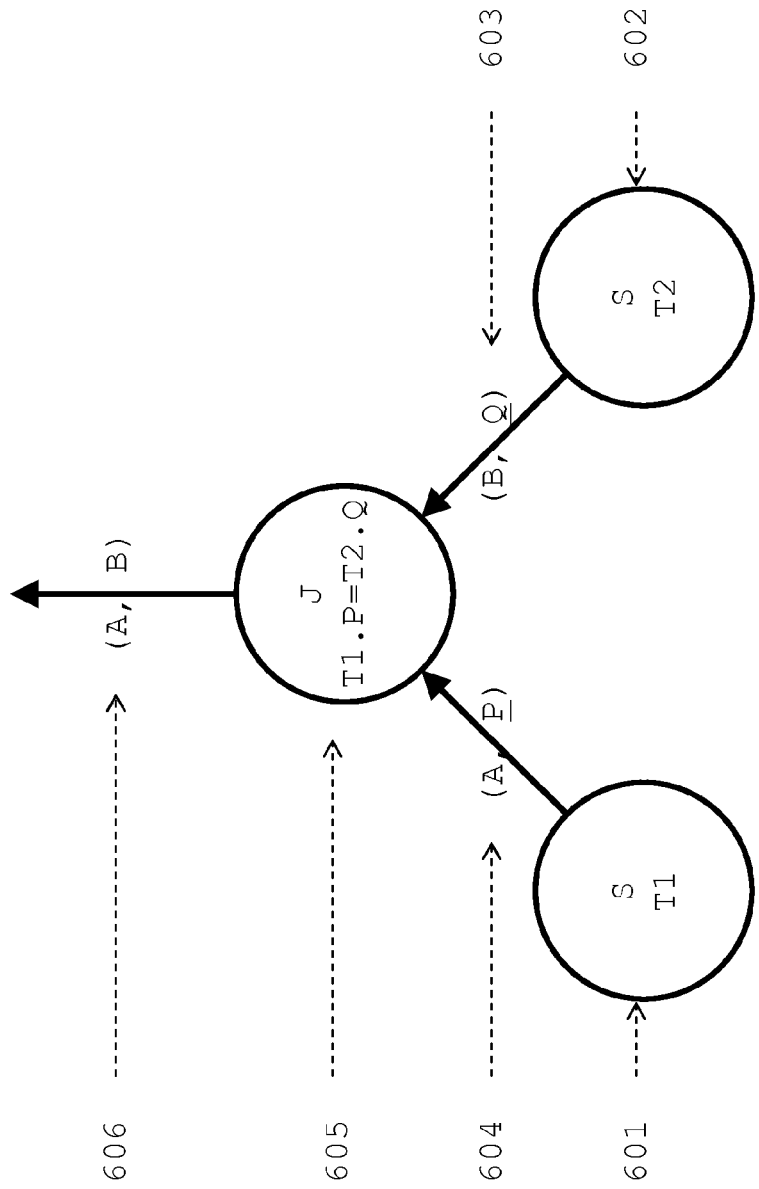
Figure 6: Bubble Diagram for sample query

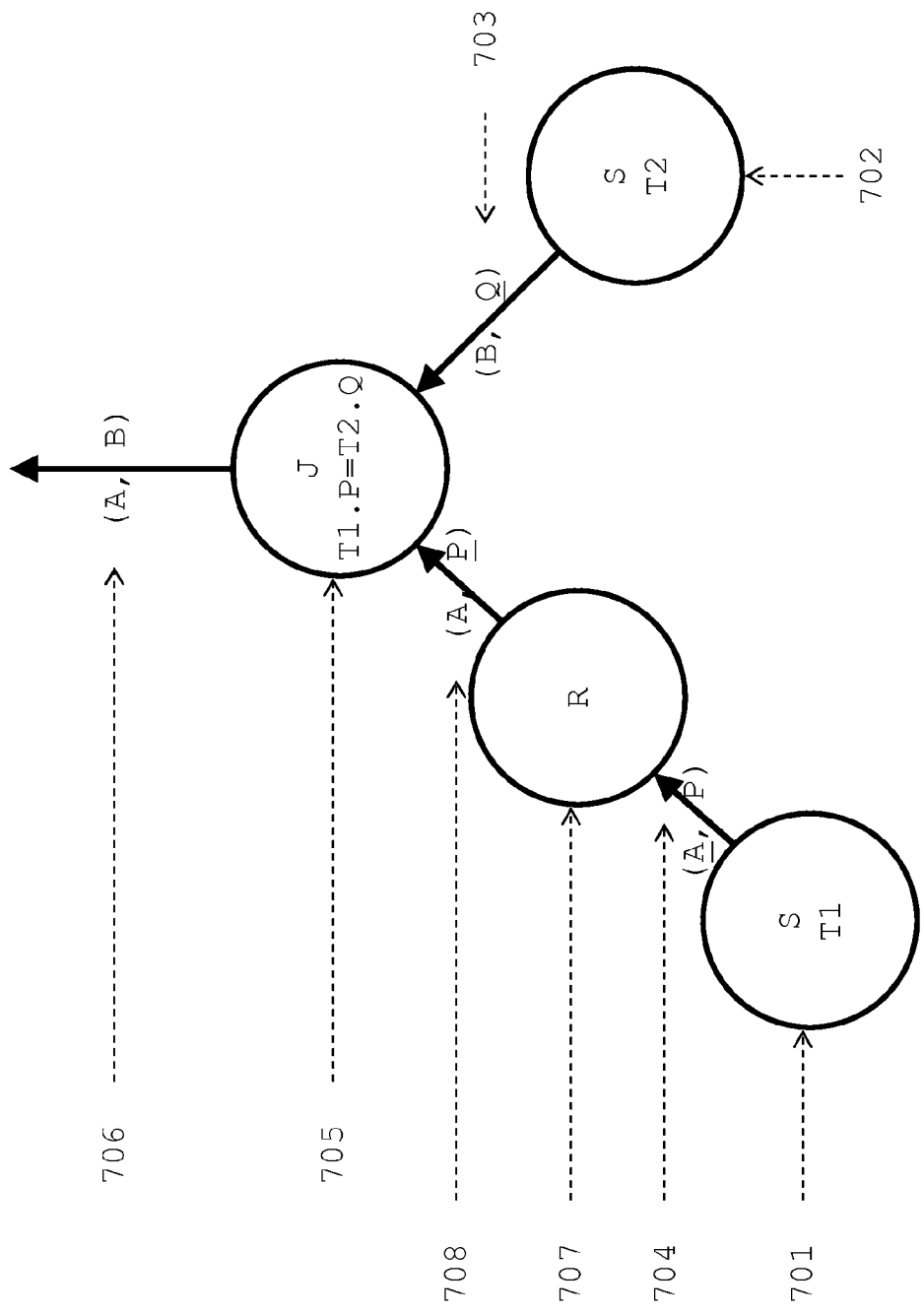
Figure 7: Bubble Diagram for sample query after QRR

```
NAME: FOJ
PREREQUISITES: NONE
PRIORITY: 12
INPUTS: A, B
OUTPUTS: C
MODIFIES TREE: YES
MODIFIES GEOMETRY: YES
REFERENCES: IS_JOINABLE, REDISTRIBUTE
ACTION 1:
        # THIS RULE PERFORMS THE ACTIONS REQUIRED FOR THE
        # FOJ BUBBLE AND ENSURES THAT STREAMS ARE DISTRIBUTED
        # FOR THE JOIN
        PRIORITY: 1
        IF IS_JOINABLE(THIS.WHERE, A, B)
                NOP
        ELSE
                FOR X IN (INPUT)
                        BEGIN
                                REDISTRIBUTE (X, THIS)
                        END
        END
ACTION 2:
        PRIORITY: 10
        ACTION: NOP
```

Figure 8: Illustration of the rules for a Full Outer Join Bubble

```
FUNCTION IS_JOINABLE ( JOIN C, STREAM A, STREAM B ) RETURNS BOOLEAN
BEGIN
    IF (DISTRIBUTION_TYPE (A) == EDD &&
        DISTRIBUTION_TYPE (B) == EDD &&
        JOINS (DISTRIBUTION (A), DISTRIBUTION(B), C))
            RETURN TRUE;
    ELSE IF ((DISTRIBUTION_TYPE (A) == BROADCAST ||
              DISTRIBUTION_TYPE (B) == BROADCAST) &&
             LOCUS(A) == LOCUS(B))
            RETURN TRUE;
    ELSE
            RETURN FALSE;
    END IF;
END
```

Figure 9: Illustration of a function IS_JOINABLE

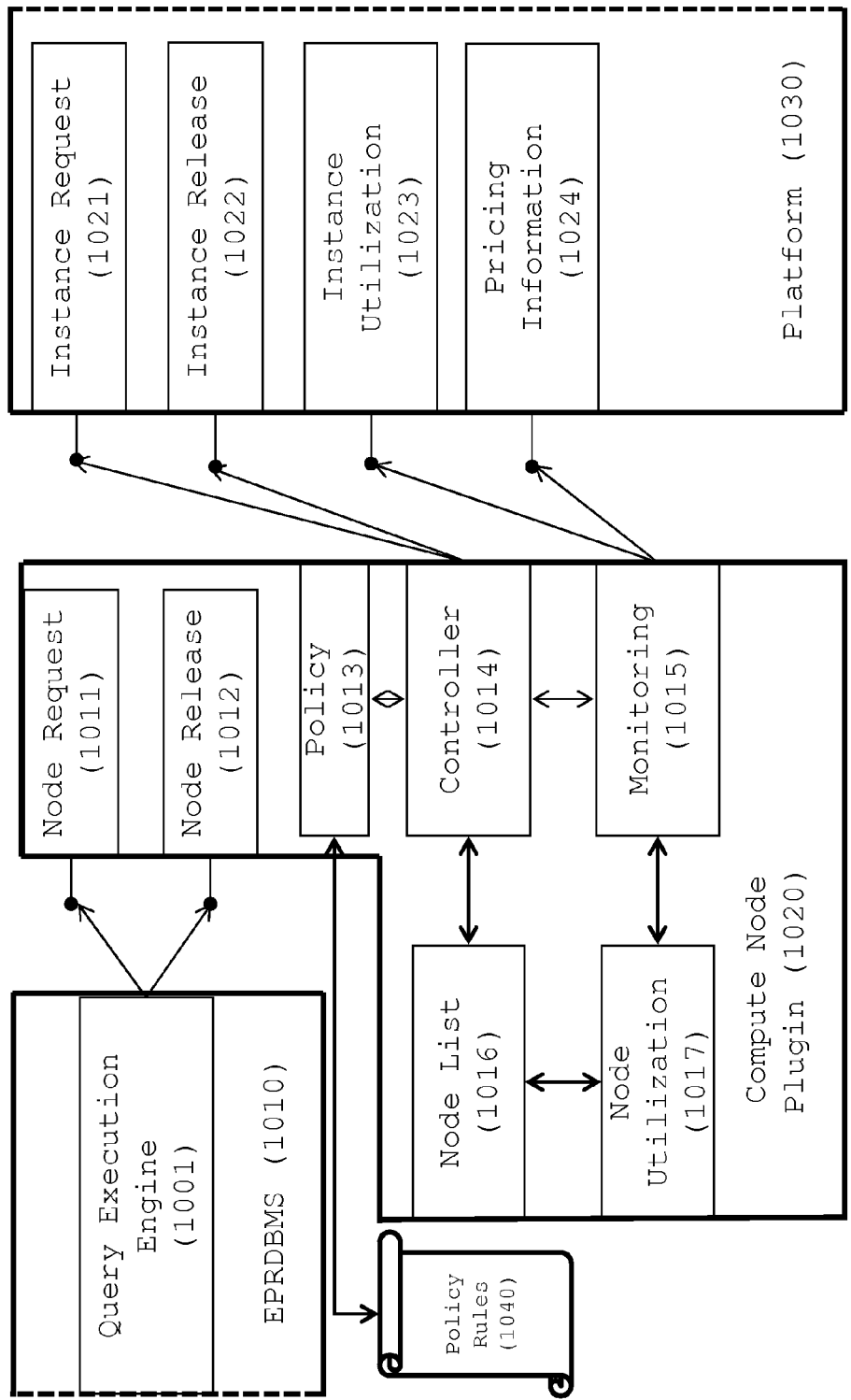
Figure 10: Provisioning Compute Nodes with a single platform

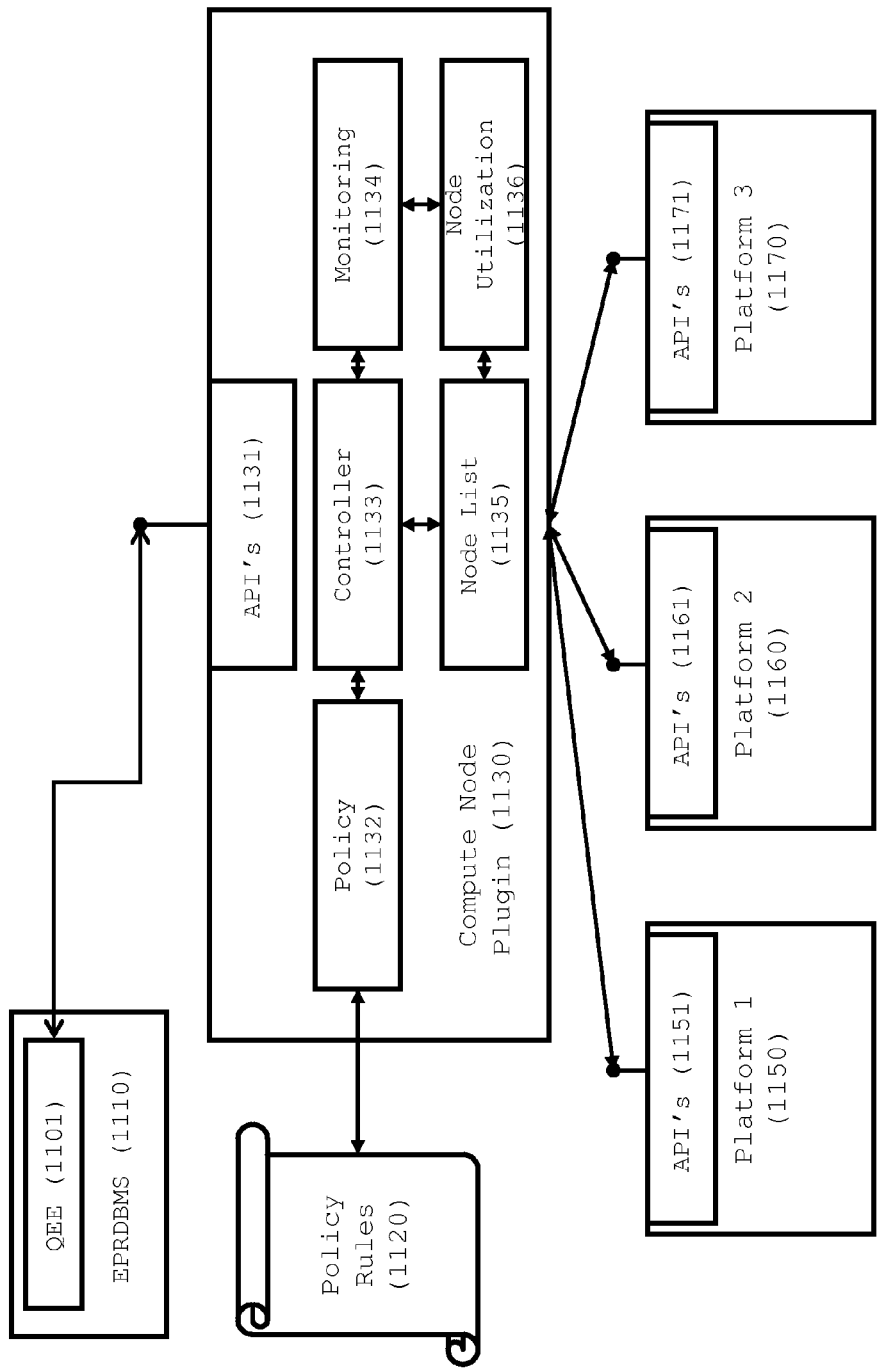
Figure 11: Provisioning Compute Nodes with multiple platforms

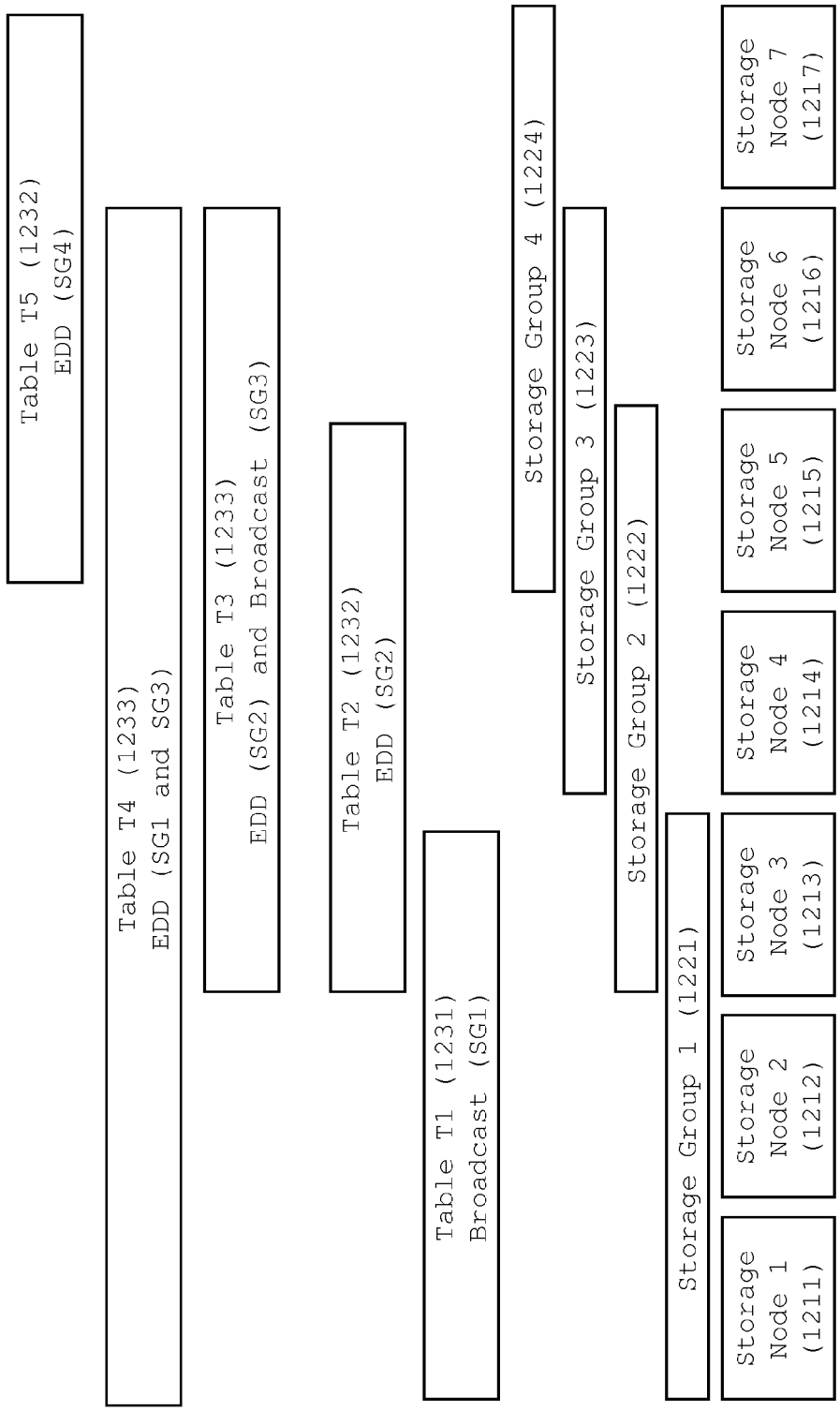
Figure 12: Multiple tables and storage groups.

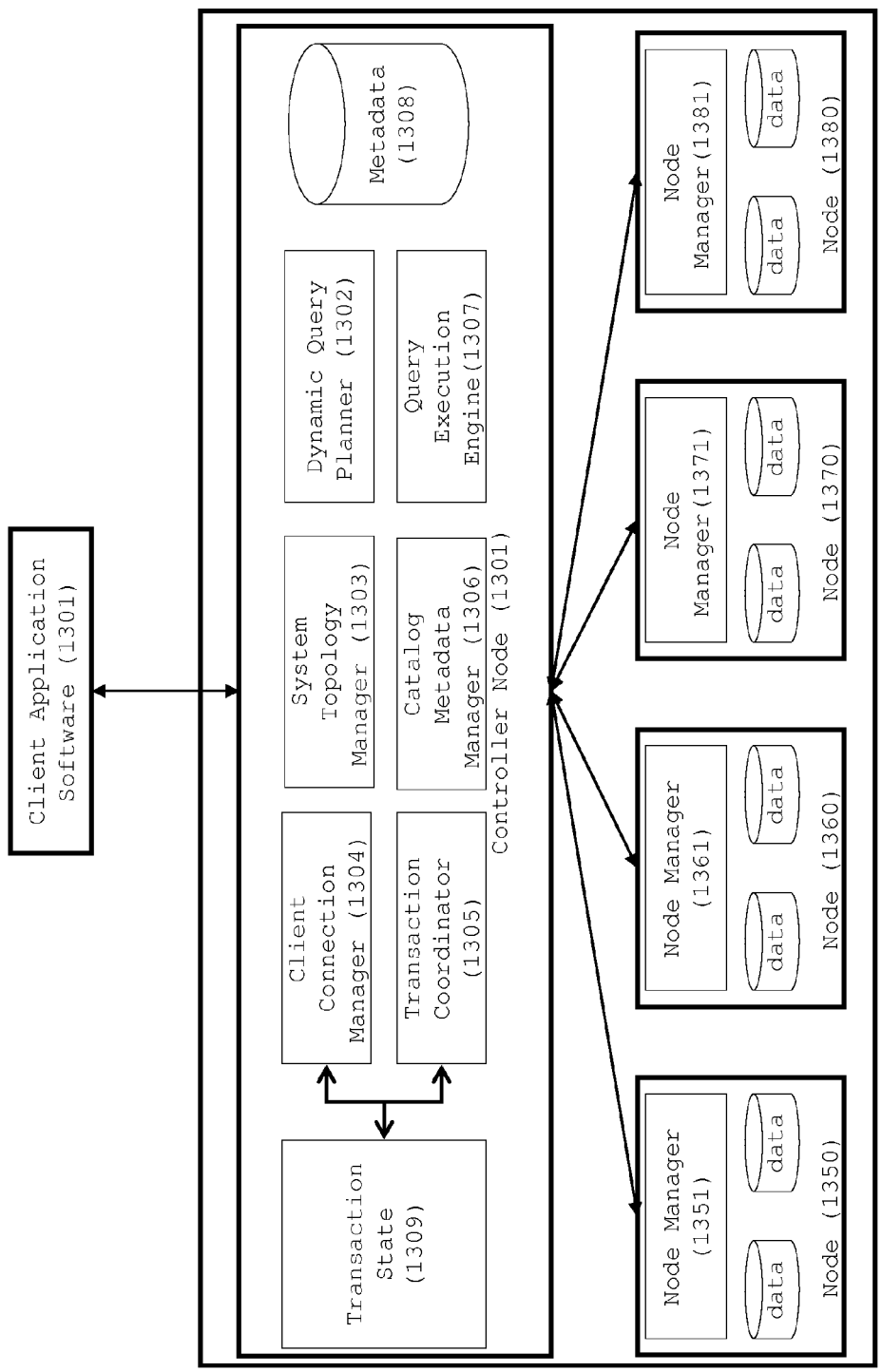
Figure 13: Handling distributed transactions in EPRDBMS

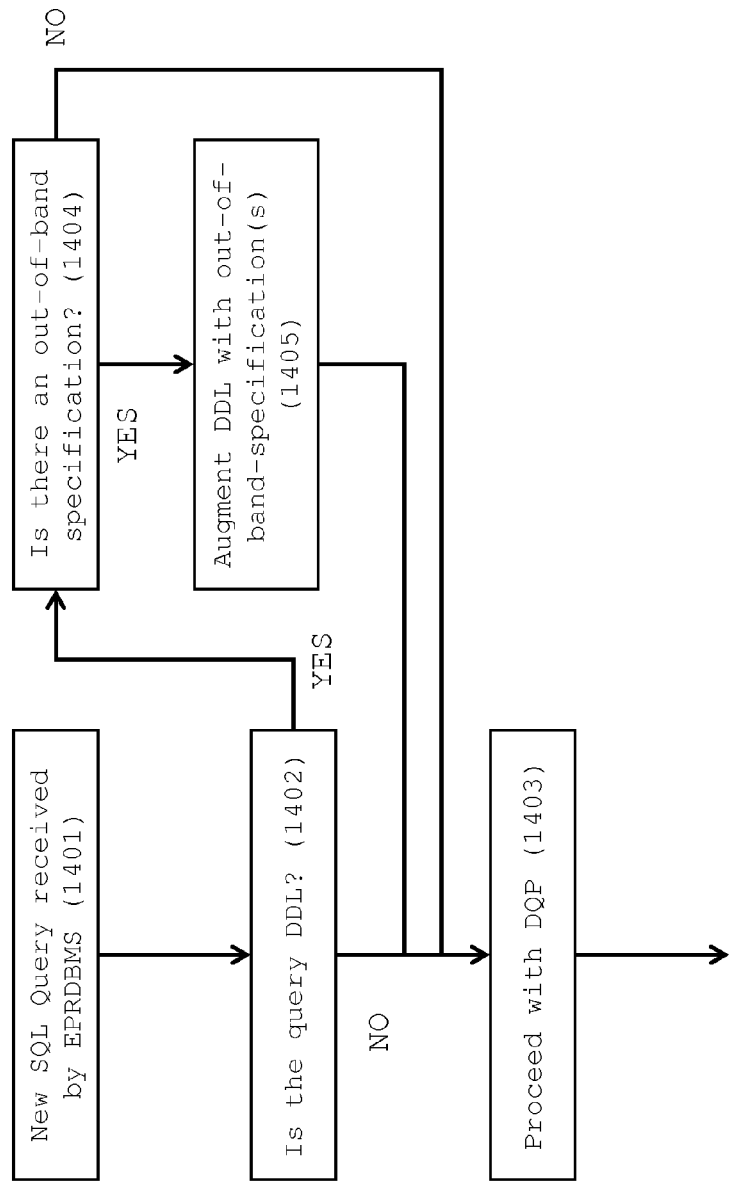
Figure 14: Overview of Out-of-band specification of DDL

```
NAME: CUSTOMER-TABLE                                      (1501)
OVERRIDES: SYSTEM.CUSTOMER-TABLE                          (1502)
TABLENAME: *CUSTOMER                                      (1503)
SIGNATURE: 7A4B1642                                       (1504)
PRIORITY: 10                                              (1505)
PROLOGUE:                                                 (1506)
    CREATE RANGE IF NOT EXISTS AC_RANGE(INT)              (1507)
    STORAGE GROUP <THIS>;                                 (1508)
SPECIFICATION:                                            (1509)
    DISTRIBUTE ON (CID) USING RANGE AC_RANGE;             (1510)
END                                                       (1511)
```

Figure 15: An example of an out-of-band specification

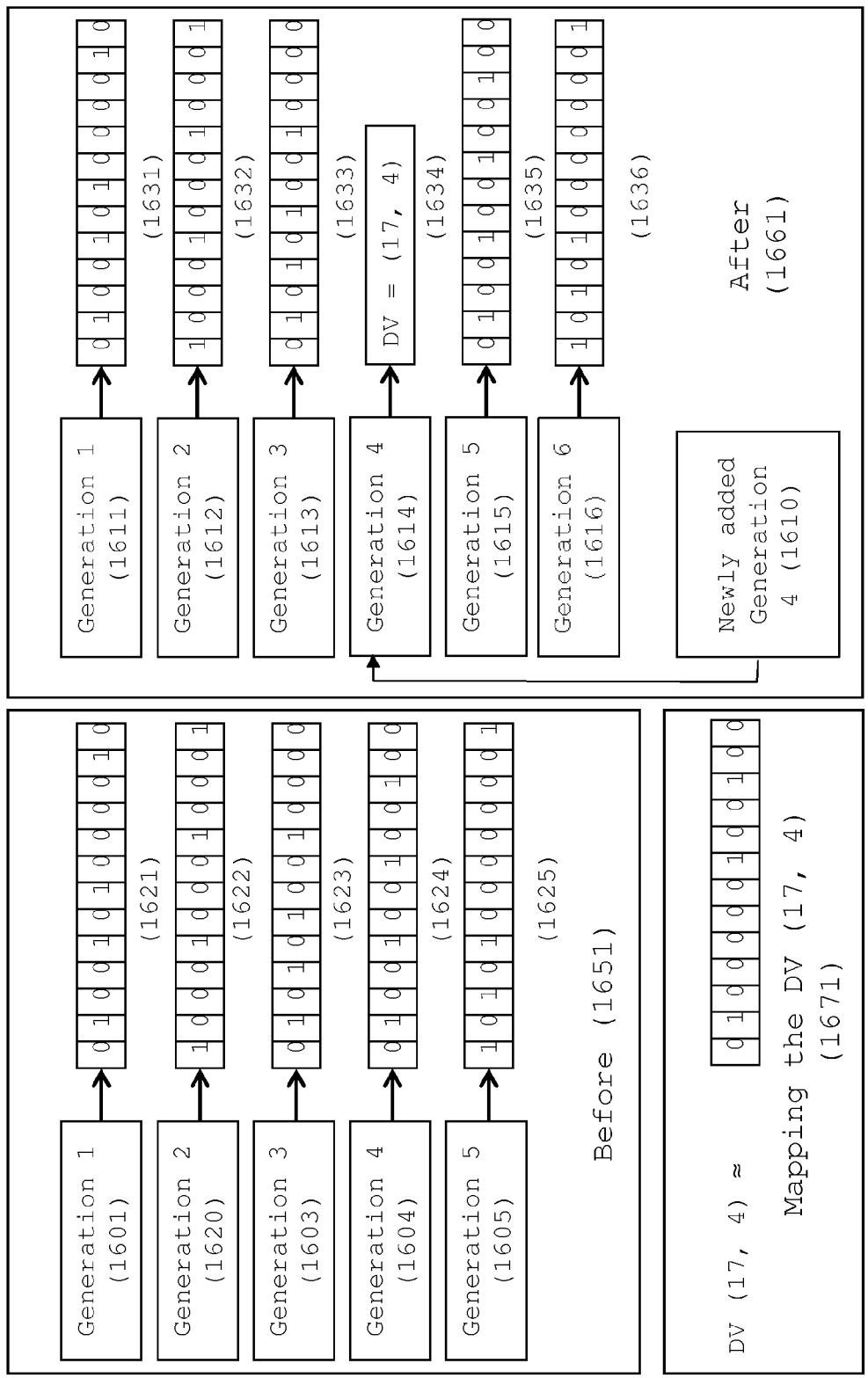
Figure 16: Relocation of a DV

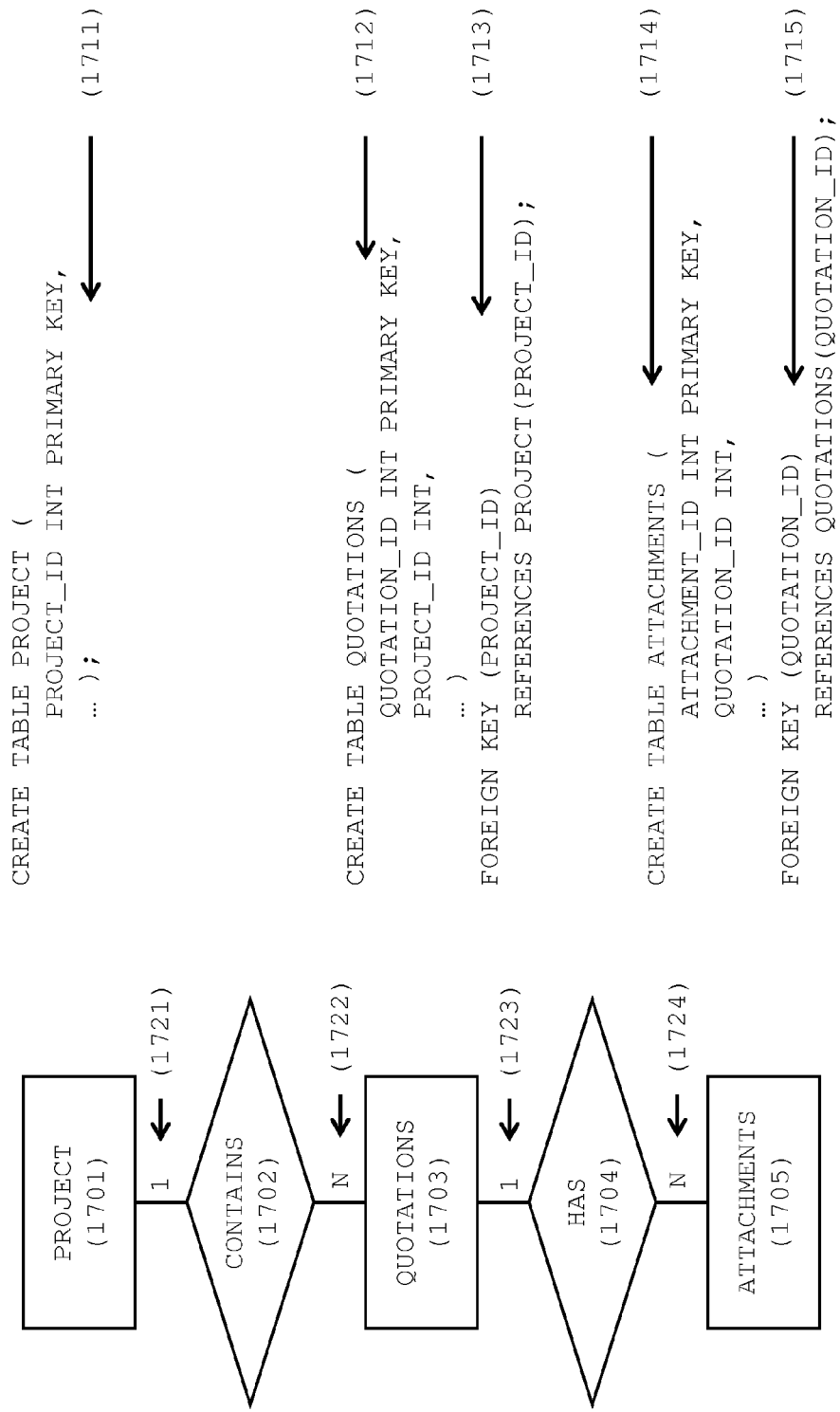
Figure 17: An Entity Relationship Diagram showing a hierarchical schema with corresponding SQL DDL

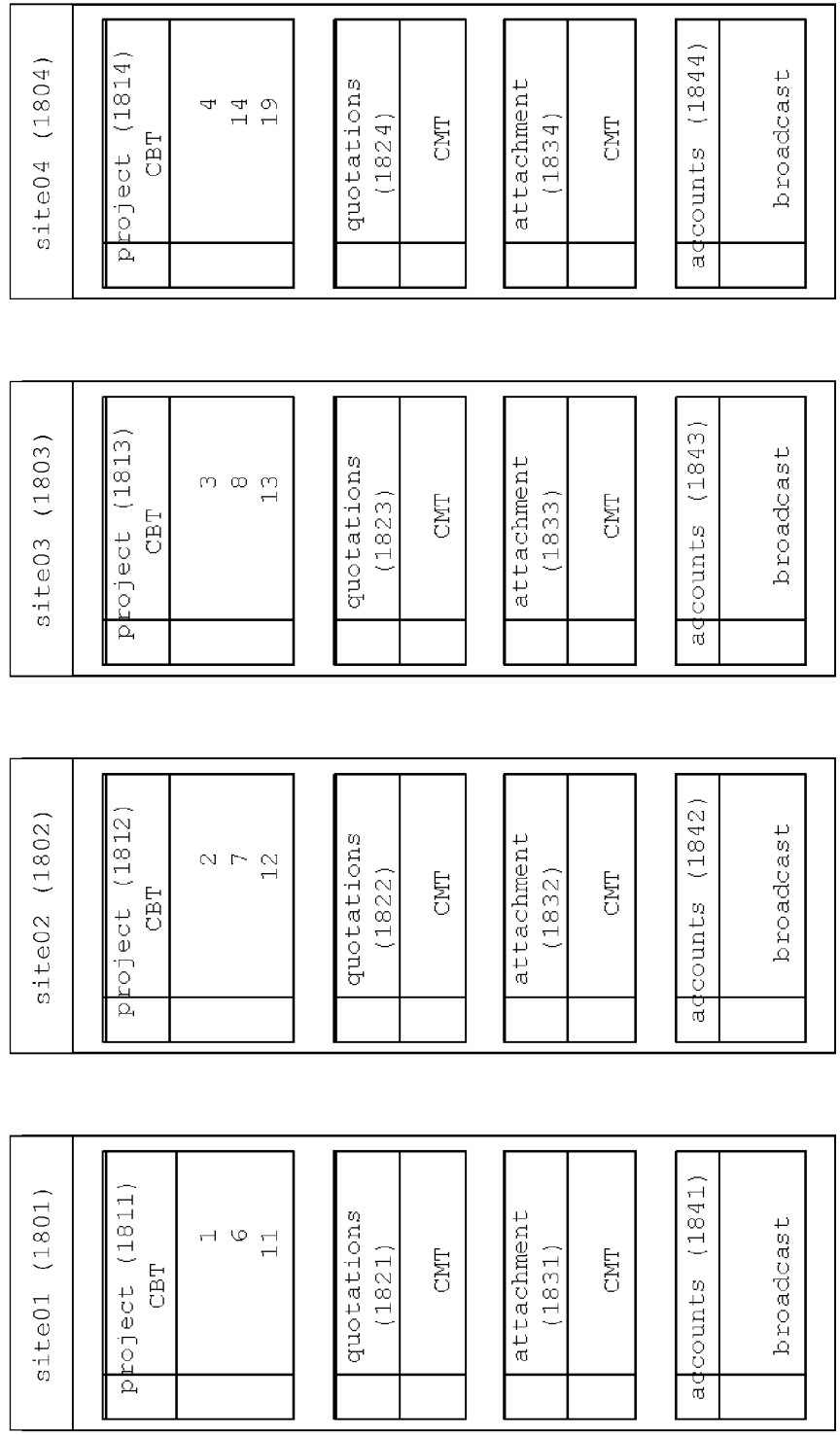
Figure 18: The definition of container based data distribution in an EPRDBMS

```
CREATE CONTAINER pContainer STORAGE GROUP defaultSG;                    (1901)

CREATE TABLE PROJECT (project_id int, ...)
    EDD (project_id),                                                   (1902)
    DISCRIMINATOR FOR CONTAINER pContainer;

CREATE TABLE QUOTATIONS(columns) FOREIGN KEYS ...                       (1903)
    CONTAINER DISTRIBUTE pContainer;

CREATE TABLE ATTACHMENT(columns) FOREIGN KEYS ...                       (1904)
    CONTAINER DISTRIBUTE pContainer;

CREATE TABLE ACCOUNTS (columns) STORAGE GROUP defaultSG                 (1905)
    BROADCAST DISTRIBUTE;
```

Figure 19: Illustrating the DDL for CONTAINER BASED DATA DISTRIBUTION

```
USING CONTAINER pContainer (NULL);                    (2001)

SELECT * FROM PROJECTS;                               (2002)

SELECT P.NAME, A.NAME                                 (2003)
FROM PROJECTS P, ACCOUNTS A
WHERE P.ACCOUNT_ID = A.ACCOUNT_ID;

SELECT   P.PROJECT_ID,                                (2004)
         Q.QUOTATION_ID
FROM PROJECTS P, QUOTATIONS Q
WHERE P.PROJECT_ID = Q.PROJECT_ID;
```

Figure 20: Illustration of DQP decisions in the NULL CC

```
USING CONTAINER pContainer (GLOBAL);                    (2101)

SELECT * FROM PROJECTS;                                 (2102)

SELECT P.NAME, A.NAME
FROM PROJECTS P, ACCOUNTS A
WHERE P.ACCOUNT_ID = A.ACCOUNT_ID;                      (2103)

SELECT  P.PROJECT_ID,
        Q.QUOTATION_ID
FROM PROJECTS P, QUOTATIONS Q
WHERE P.PROJECT_ID = Q.PROJECT_ID;                      (2104)
```

Figure 21: Illustration of DQP decisions in the GLOBAL CC

```
USING CONTAINER pContainer (7);                    (2201)

SELECT * FROM PROJECTS;                            (2202)

SELECT P.NAME, A.NAME                              (2203)
FROM PROJECTS P, ACCOUNTS A
WHERE P.ACCOUNT_ID = A.ACCOUNT_ID;

SELECT  P.PROJECT_ID,                              (2204)
        Q.QUOTATION_ID
FROM PROJECTS P, QUOTATIONS Q
WHERE P.PROJECT_ID = Q.PROJECT_ID;
```

Figure 22: Illustration of DQP decisions in a specified CC

```
INSERT INTO PROJECTS (PROJECT_ID, ...)                              (2301)
VALUES (20, ... );

INSERT INTO QUOTATIONS (QUOTATION_ID, PROJECT_ID, ...)              (2302)
VALUES (46, 20, ...)

INSERT INTO PROJECTS (PROJECT_ID, ...)                              (2303)
VALUES (21, ... );

INSERT INTO QUOTATIONS (QUOTATION_ID, PROJECT_ID, ...)              (2304)
VALUES (46, 21, ...)

INSERT INTO ATTACHMENTS (ATTACHMENT_ID, QUOTATION_ID, ...)          (2305)
VALUES (74, 46, ...)
```

Figure 23: Other ways of specifying the Container Context

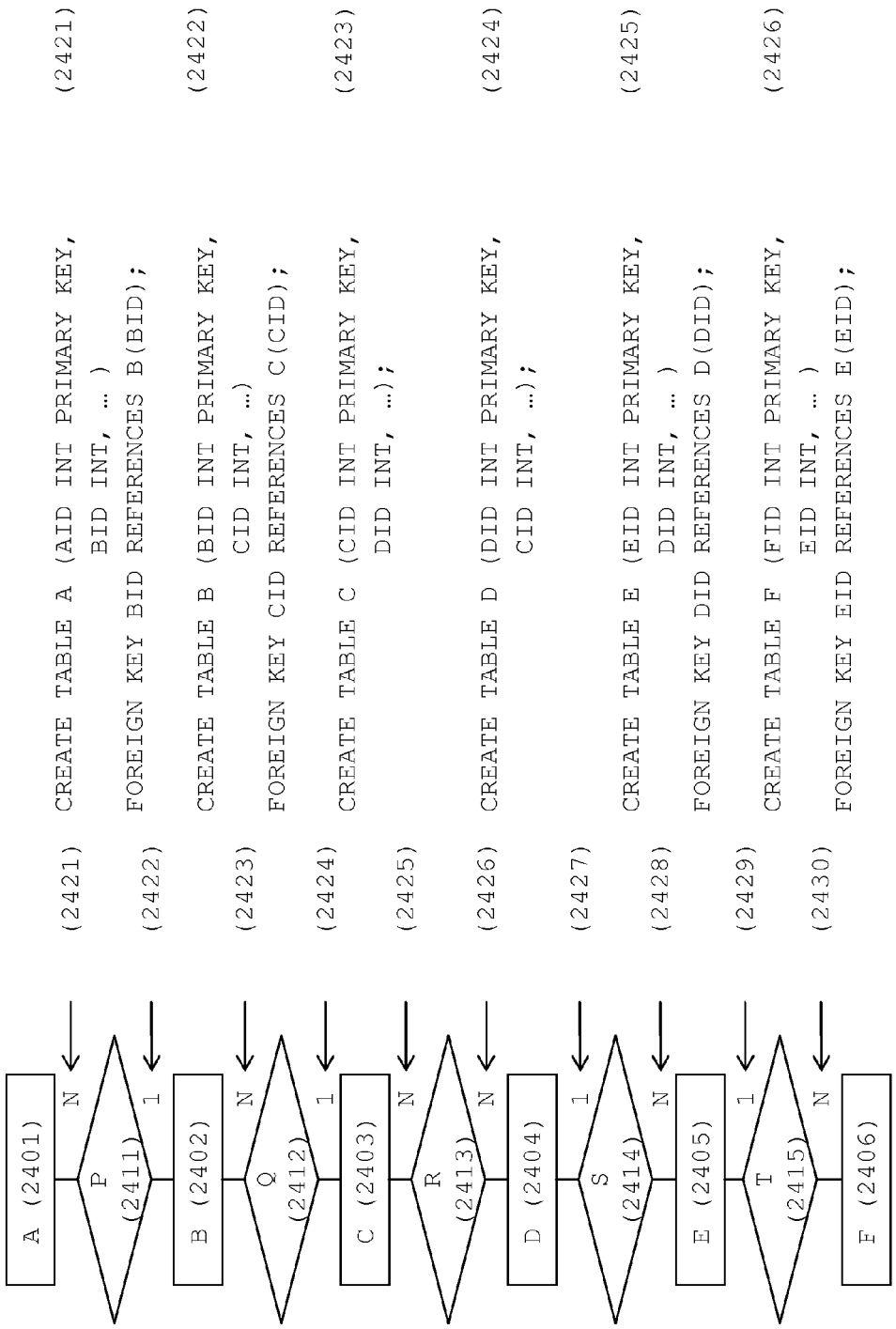
Figure 24: An Entity Relationship Diagram showing a hierarchical schema with multiple hierarchies, and corresponding SQL DDL

```
CREATE CONTAINER cContainer STORAGE GROUP sg1;                    (2501)

CREATE CONTAINER dContainer STORAGE GROUP sg2;                    (2502)

CREATE TABLE E (columns) ... FOREIGN KEYS ...
CONTAINER DISTRIBUTE dContainer;                                  (2503)

CREATE TABLE F (columns) ... FOREIGN KEYS ...
CONTAINER DISTRIBUTE dContainer;                                  (2504)

CREATE TABLE A (columns) ... FOREIGN KEYS ...
CONTAINER DISTRIBUTE cContainer;                                  (2505)

CREATE TABLE B (columns) ... FOREIGN KEYS ...
CONTAINER DISTRIBUTE cContainer;                                  (2506)

CREATE TABLE C (cid int, ...)
    EDD (cid),
    DISCRIMINATOR FOR CONTAINER cContainer;                       (2507)

CREATE TABLE D (did int, ...)
    EDD (did),
    DISCRIMINATOR FOR CONTAINER dContainer;                       (2508)
```

Figure 25. Illustration of DDL for Container Based Data Distribution of multiple hierarchies

```
USING CONTAINER cContainer (NULL);                          (2601)
USING CONTAINER dContainer (NULL);

SELECT B.BID, C.CID, D.DID, E.EID
FROM B, C, D, E WHERE
B.CID = C.CID AND
C.CID = D.CID AND
C.DID = D.DID AND
D.DID = E.DID;                                              (2602)

USING CONTAINER cContainer (NULL);                          (2603)
USING CONTAINER dContainer (14);

SELECT B.BID, C.CID, D.DID, E.EID
FROM B, C, D, E WHERE
B.CID = C.CID AND
C.CID = D.CID AND
C.DID = D.DID AND
D.DID = E.DID;                                              (2604)
```

Figure 26: Illustrations of queries in a multi-container situation (1)

```
USING CONTAINER cContainer (16);
USING CONTAINER dContainer (19);                        (2701)

SELECT B.BID, C.CID, D.DID, E.EID
FROM B, C, D, E WHERE
B.CID = C.CID AND
C.CID = D.CID AND
C.DID = D.DID AND
D.DID = E.DID;                                          (2702)

USING CONTAINER cContainer (GLOBAL);
USING CONTAINER dContainer (19);                        (2703)

SELECT B.BID, C.CID, D.DID, E.EID
FROM B, C, D, E WHERE
B.CID = C.CID AND
C.CID = D.CID AND
C.DID = D.DID AND
D.DID = E.DID AND
D.DID = 19;                                             (2704)
```

Figure 27: Illustrations of queries in a multi-container situation (2)

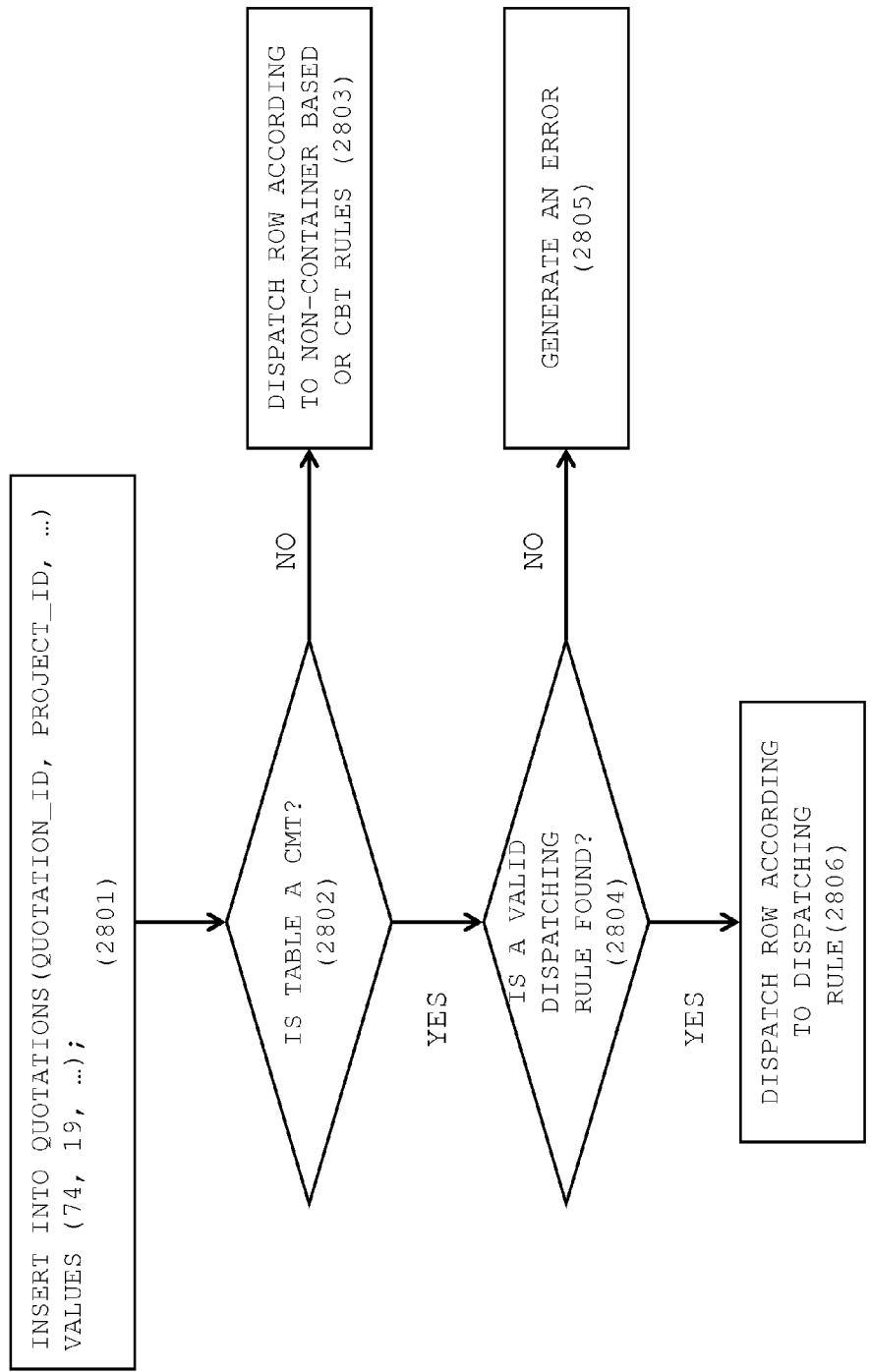
Figure 28: System Operation in AUTOMATIC-CC during CMT INSERT's

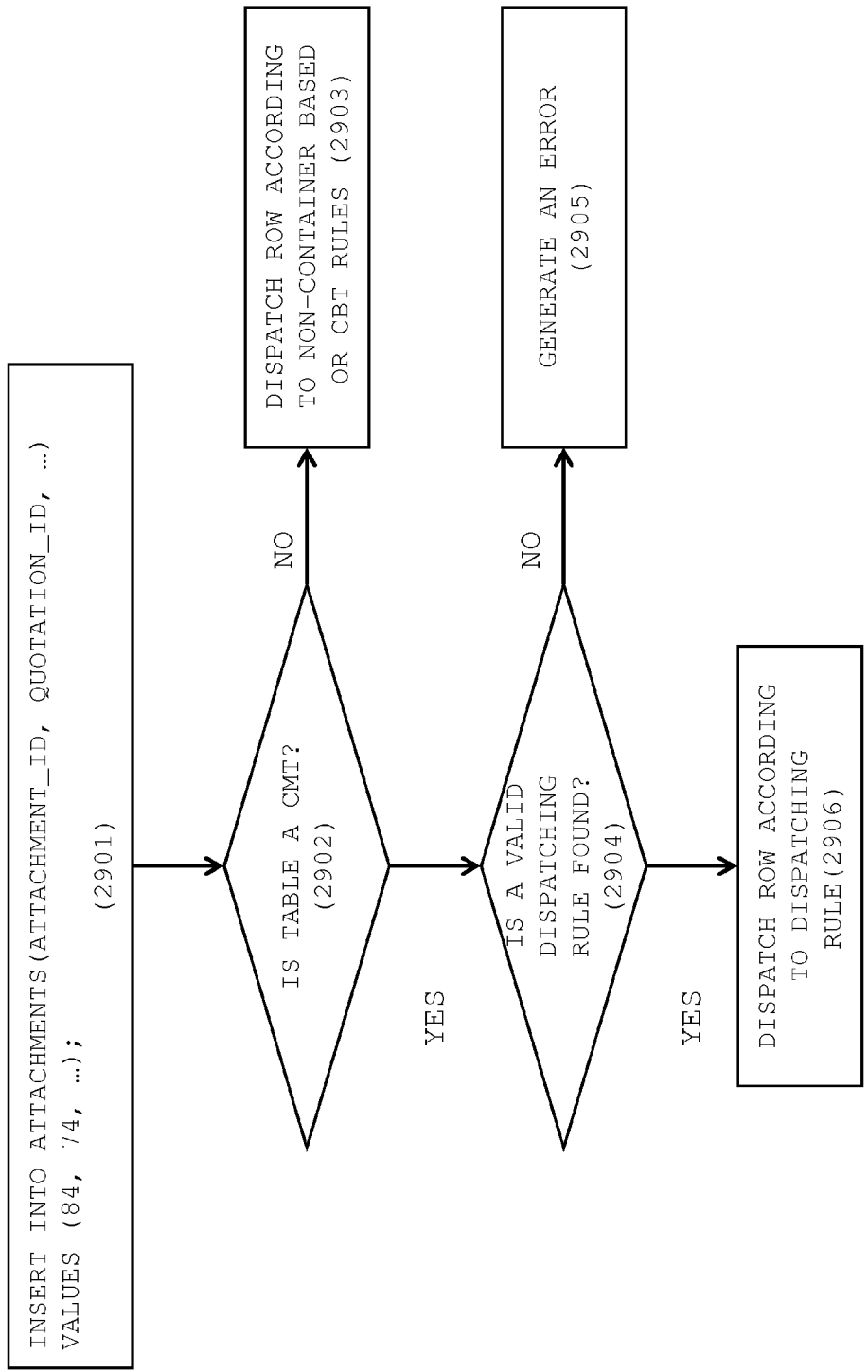
Figure 29: System Operation in AUTOMATIC-CC during CMT INSERT's

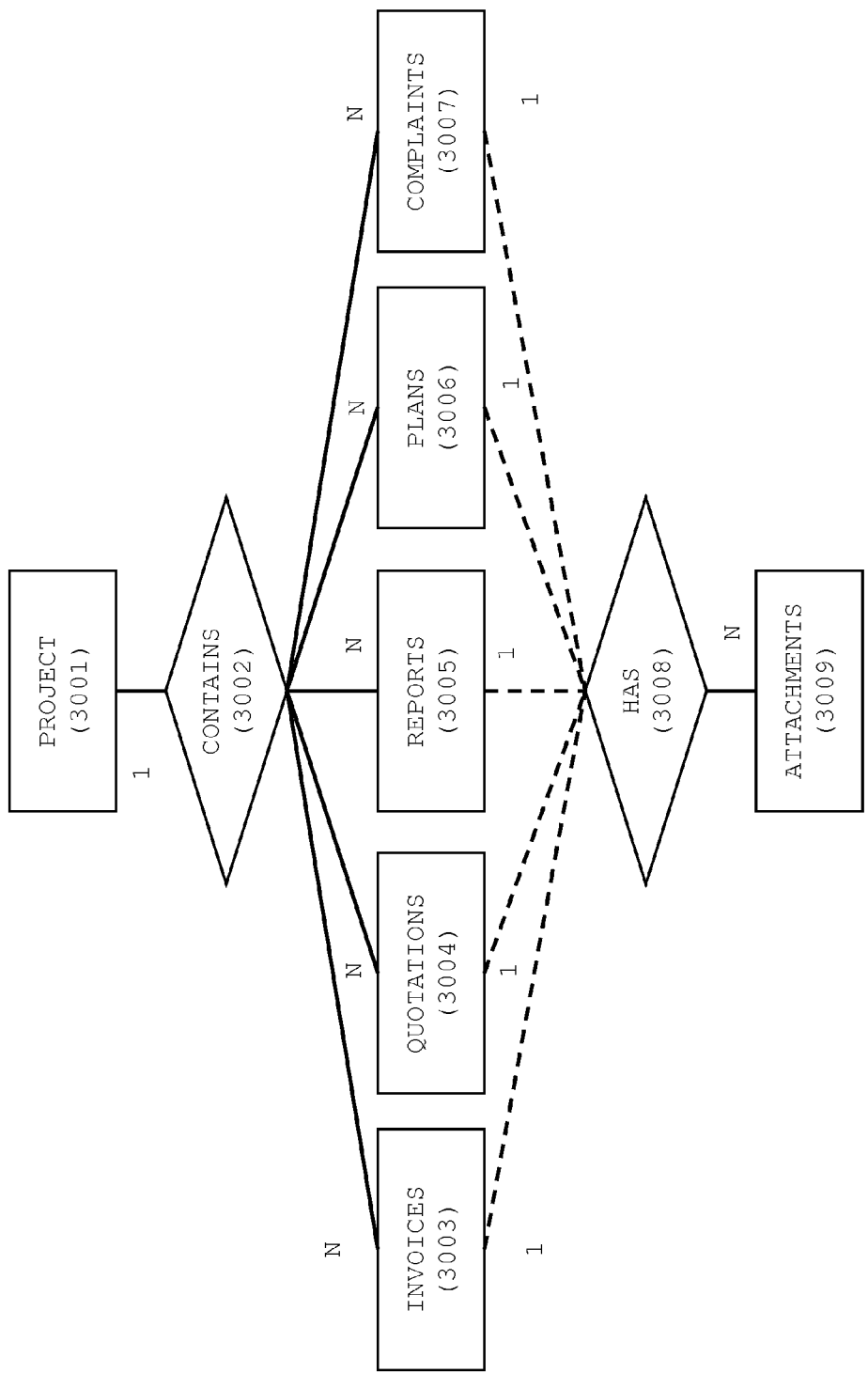
Figure 30: A polymorphic schema relationship

```
CREATE CONTAINER pContainer STORAGE GROUP defaultSG;
CREATE TABLE PROJECT (project_id int, ...)
    EDD (project_id),
    DISCRIMINATOR FOR CONTAINER pContainer;
CREATE TABLE QUOTATIONS(columns) FOREIGN KEYS ...
    CONTAINER DISTRIBUTE pContainer;
CREATE TABLE REPORTS(columns) FOREIGN KEYS ...
    CONTAINER DISTRIBUTE pContainer;
CREATE TABLE INVOICES(columns) FOREIGN KEYS ...
    CONTAINER DISTRIBUTE pContainer;
CREATE TABLE PLANS(columns) FOREIGN KEYS ...
    CONTAINER DISTRIBUTE pContainer;
CREATE TABLE COMPLAINTS(columns) FOREIGN KEYS ...
    CONTAINER DISTRIBUTE pContainer;
```
{ 3101

```
CREATE TABLE ATTACHMENT(   a_id int,
             rel_type char(30),
             rel_id int)
    POLYMORPHIC KEY a_rule (rel_type, rel_id)
    CONTAINER DISTRIBUTE pContainer;
```
{ 3102

Figure 31: DDL for polymorphic schema of Figure 30

```
CREATE POLYMORPHIC KEY a_rule (TYPE, ID) AS          (3201)
    CASE WHEN TYPE = 'QUOTATIONS' THEN               (3202)
        FOREIGN KEY (ID)                             (3203)
            REFERENCES QUOTATIONS(ID)                (3204)
    CASE WHEN TYPE = 'INVOICES' THEN                 (3205)
        FOREIGN KEY (ID)
            REFERENCES INVOICES(ID)
    CASE WHEN TYPE = 'PLANS' THEN                    (3206)
        FOREIGN KEY (ID)
            REFERENCES PLANS(ID)
    CASE WHEN TYPE = 'COMPLAINTS' THEN               (3207)
        FOREIGN KEY (ID)
            REFERENCES COMPLAINTS(ID)
    CASE WHEN TYPE = 'REPORTS' THEN                  (3208)
        FOREIGN KEY (ID)
            REFERENCES REPORTS(ID)
END;
```

Figure 32: DDL for POLYMORPHIC KEY a_rule in Figure 31

(3301) REDISTRIBUTE INTO TEMP1 (A, X)
ONTO DEFAULT-COMPUTE (X)
SELECT A, X FROM T1;

(3302) REDISTRIBUTE INTO TEMP2 (B, Y)
ONTO DEFAULT-COMPUTE (Y)
SELECT B, Y FROM T2;

(3303) EXECUTE ON DEFAULT-COMPUTE
SELECT TEMP1.A, TEMP2.B
FROM TEMP1, TEMP2
WHERE TEMP1.X = TEMP2.Y;

Figure 33: Query plan for a query involving redistribution

```
REDISTRIBUTE INTO TEMP1 (A, X)                    (3401)
ONTO DEFAULT-COMPUTE (X)
GENERATE INCLUSION-LIST (X) AS LIST-X
    SELECT A, X FROM T1;

REDISTRIBUTE INTO TEMP2 (B, Y)                    (3402)
ONTO DEFAULT-COMPUTE (Y)
    SELECT B, Y
    FROM T2
    WHERE Y IN (LIST-X);

EXECUTE ON DEFAULT-COMPUTE                        (3403)
    SELECT TEMP1.A, TEMP2.B
    FROM TEMP1, TEMP2
    WHERE TEMP1.X = TEMP2.Y;
```

Figure 34: An query plan for the query involving steps to optimize and minimize redistribution

```
REDISTRIBUTE INTO TEMP2 (B, Y)                          (3501)
ONTO DEFAULT-COMPUTE (Y)
GENERATE INCLUSION-LIST (Y) AS LIST-Y
    SELECT B, Y FROM T2;

REDISTRIBUTE INTO TEMP1 (A, X)                          (3502)
ONTO DEFAULT-COMPUTE (X)
    SELECT A, X
    FROM T1
    WHERE X IN (LIST-Y);

EXECUTE ON DEFAULT-COMPUTE                              (3503)
    SELECT TEMP1.A, TEMP2.B
    FROM TEMP1, TEMP2
    WHERE TEMP1.X = TEMP2.Y;
```

Figure 35: An alternate query plan for the query involving steps to optimize and minimize redistribution

US 9,064,031 B2

ADVANCEMENTS IN DATA DISTRIBUTION METHODS AND REFERENTIAL INTEGRITY

RELATED APPLICATIONS

This application is a continuation of commonly assigned copending U.S. patent application Ser. No. 13/966,980, which was filed on Aug. 14, 2013, by Mrithyunjaya Annapragada for ADVANCEMENTS IN DATA DISTRIBUTION METHODS AND REFERENTIAL INTEGRITY and claims the benefit of and filing date priority to a U.S. Provisional Patent Application Ser. No. 61/757,809 filed Jan. 29, 2013 entitled "METHODS AND APPARATUS FOR IMPROVING THE EFFICIENCY OF ELASTIC PARALLEL DATABASE MANAGEMENT SYSTEMS". It also relates generally to a prior U.S. patent application Ser. No. 13/690,496 filed Nov. 30, 2012 entitled "Mechanism for Co-Located Data Placement in a Parallel Elastic Database Management System". The entire contents of each those patent applications are hereby incorporated by reference.

TECHNICAL FIELD

This patent application relates generally to data management systems, and more specifically to a parallel and shared-nothing relational database management system.

BACKGROUND

Relational Database Management Systems are sometimes referred to as RDBMS.

Distributed RDBMS that are implemented according to a "Shared Nothing" system architecture are sometimes referred to as Parallel Database Servers (in contrast to Symmetric Multiprocessing (SMP) Database Servers) and when the number of logical computers in the Parallel Database Server is large, this is sometimes referred to as "Massively Parallel Processing" or MPP architecture.

Conventionally, the number of logical computer servers that participate in parallel database architectures remains constant during the life of the system. Elastic Parallel Database Servers are an extension of the static MPP architecture where the number and composition of the computer servers may change during query processing, often in response to the demands being placed on the system. We refer to Elastic Parallel Database Management Systems as EPRDBMS.

SUMMARY

Relational Database Management Systems (RDBMS) maintain metadata information about the schema, and in the case of EPRDBMS the metadata includes information about the placement of data on the system.

In cases where an RDBMS is used to store data for a Software as a Service (SaaS) application, it is very common that each client of the service has its data and customizations stored in a database on the RDBMS. In this kind of application architecture, there is a one-to-one mapping between clients and databases, and therefore a SaaS application with many clients would necessarily have many databases.

In an SMP RDBMS, each database resides on a single server and in an MPP RDBMS each database may reside on a plurality of database servers. For the purposes of this preceding statement we refer only to a single copy of the database, but multiple copies of the data may be maintained for the purpose of high-availability and redundancy.

The Elastic Parallel RDBMS (EPRDBMS) includes a Dynamic Query Planner that converts queries submitted to the application into query execution plans that consist of a sequence of operations that must be performed by individual nodes in the system in a specified order in order to produce the results expected by the application.

Data in the EPRDBMS is stored in tables that are associated with storage group(s), and the data in the tables is distributed across a plurality of storage nodes that are members of the storage group, using one of many distribution methods, some of which are data dependent and some of which are data independent. Tables are grouped into logical collections called databases.

Elasticity in the EPRDBMS is achieved through abstractions like storage nodes grouped into storage nodegroups, and compute nodes grouped into compute nodegroups, and mechanisms that allow for these to be provisioned dynamically based on the workload being placed on the system at any given instant of time.

The EPRDBMS ensures that applications are guaranteed well understood database ACID properties; Atomicity, Consistency, Isolation, and Durability, and it also provides applications with the ability to perform groups of operations that are either all completed or all aborted but never a situation where some but not all of the operations are completed.

Unless explicitly described to the contrary, this document only refers to the first (primary) copy of a database. Without loss of generality, concepts described here also apply to all copies of the database. This is for simplicity of illustration and so as to not obscure key aspects of the invention.

Commands and operations are submitted to a database in some query language that is mutually understood by the client and the EPRDBMS, such as the Structured Query Language (SQL) on a 'connection' established by the client with the EPRDBMS for this purpose. Persistent state about the connection is maintained by the database along with each connection.

BRIEF DESCRIPTION OF THE DRAWINGS

FIG. 1. A multi-client SaaS Database showing database creation

FIG. 2. A multi-client SaaS Database showing table creation

FIG. 3. A multi-client SaaS Database

FIG. 4. A multi-client SaaS Database showing table alteration

FIG. 5. A multi-client SaaS Database showing a query and filters based on schema-decorations FIG. 6. A bubble-diagram showing a simple query FIG. 7. A bubble diagram showing a sample query after processing by the Query Rewrite Engine (QRR)

FIG. 8. An illustration of the rules for a Full Outer Join Bubble

FIG. 9. An illustration of a function IS_JOINABLE invoked by the Full Outer Join Bubble FIG. 10. Provisioning Compute Nodes with a single platform FIG. 11. Provisioning Compute Nodes with multiple platforms FIG. 12. Multiple tables and storage groups FIG. 13. Handling distributed transactions in EPRDBMS FIG. 14. Overview of out-of-band DDL specifications FIG. 15. An example of an out-of-band specification FIG. 16. Relocation of a DV FIG. 17. An Entity Relationship Diagram showing a hierarchical schema FIG. 18. The definition of container based data distribution in an EPRDBMS FIG. 19. Illustrating the DDL for CONTAINER BASED DATA DISTRIBUTION FIG. 20. Illustration of DQP decisions in the NULL CC FIG. 21. Illustration of DQP decisions in the GLOBAL CC FIG. 22. Illustration of DQP decisions in a specified CC FIG. 23. Other ways of specifying the Container Context FIG. 24. An Entity Relationship Diagram showing a hierarchical schema with multiple hierarchies, and corresponding SQL DDL FIG. 25. Illustration of DDL for Container Based Data Distribution of multiple hierarchies FIG. 26. Illustrations of queries in a multi-container situation (1).

FIG. 27. Illustrations of queries in a multi-container situation (2).

FIG. 28. System Operation in AUTOMATIC-CC during CMT INSERT's.

FIG. 29. System Operation in AUTOMATIC-CC during CMT INSERT's.

FIG. 30. A polymorphic schema relationship

FIG. 31. DDL for polymorphic schema of FIG. 30

FIG. 32. DDL for POLYMORPHIC KEY a_rule in FIG. 31.

FIG. 33. Query plan for a query involving redistribution.

FIG. 34. An query plan for the query involving steps to optimize and minimize redistribution.

FIG. 35: An alternate query plan for the query involving steps to optimize and minimize redistribution.

DETAILED DESCRIPTION OF PREFERRED EMBODIMENTS

Adaptive Multi-Client Saas Database

Summary: Techniques and methods for improving the storage and processing of data for Software-as-a-Service Applications are provided. SaaS applications implemented according to a 'Simple SaaS configuration provide each consumer of the service (referred to as a client application) with an independent database. With a conventional RDBMS this database would reside on a single server and multiple client databases may share the same server. This model has several inefficiencies. First, the large number of databases imposes a significant overhead on the RDBMS. Second, each RDBMS is confined to a single logical database server and therefore excess capacity needs to be provided on a per database server basis. This leads to low utilizations as one has to provide this headroom for the eventuality that one database on the server experiences higher demands. Thirdly, database management operations such as backup and restore need to be done on a per-database basis and this is inefficient. Finally, when application changes require database changes, these changes must be done one application client at a time and this is also inefficient. The techniques and methods presented herein dramatically reduce these overheads, and dramatically improve the efficiencies of the RDBMS tier under the SaaS application using techniques of elastic database virtualization and EPRDBMS.

Software-as-a-Service (SaaS) applications provide the benefits and functionality of the software in an easy to consume online offering. The provider of the SaaS application operates the infrastructure on which the application is run, and the customer connects to the application over a network and interacts with it, derives the benefits from it, all without the burden of managing and operating it. Many SaaS applications store data and customizations in a relational database.

Many SaaS applications are implemented in a "Simple SaaS configuration". In this operating configuration, data and customizations for each client of the application are stored in a client specific database. In addition there may be some application-wide data that is shared by all application clients. In the Simple SaaS configuration, each client specific database is stored on a logical database server, and for efficiency, many client specific databases share the same server. However, when one client application sees increased traffic this would result in a higher load being placed on the underlying database server. When one client application sees increased traffic, it also has the potential to negatively impact all other client applications sharing the same database server. Therefore excess capacity must be provisioned on a "per database server" basis and this leads to a low overall database server utilization level.

The 'customizations' by a client may include some actions that could add, modify or delete data in the tables in the client specific database, add tables to the database schema, or modify the schema of some of the tables in the database.

An increase in number of tables per client database, and the number of clients results in a very rapid increase in the total number of tables being stored on the database server. Such an increase, the associated overhead per table and database have a considerable impact on the performance of an RDBMS. For this and other reasons, it is beneficial to reduce the number of tables and databases in the system.

A common operation with multi-client SaaS applications is a rolling upgrade where clients are progressively upgraded from one release of the SaaS application to another. These upgrades may, in addition to changing the SaaS application, require modifications be made to the underlying database including the data and the schema.

According to one aspect herein, the EPRDBMS virtualizes the 'database' and therefore while each client believes that it is communicating with a RDBMS with a dedicated database for each client, the underlying storage and data management is optimized by, among other things, reducing the number of actual databases and tables used to store the data.

When implemented in the Simple SaaS Configuration, the addition of a new client requires the creation of a new database to contain the information for that client, and the creation of the tables required to store information required for that client. The EPRDBMS herein maintains metadata information about each 'database' created for a client application and about each table created in those databases. This metadata information about each 'database' includes such things as the name of the database and any other optional information provided for by a Data Definition Language (DDL) specification. This metadata information about a table includes such things as the names of the column, the data type of the column, and any additional optional information about the column as provided for by the DDL specification.

In subsequent paragraphs we use terms such as the list of 'known-databases', 'known-tables', 'schema-decorations'. These are collectively part of the metadata maintained by the EPRDBMS. The namespace within which these lists are maintained may be a global namespace (a single global list of known-databases, tables and decorations) or one or more of a number of namespaces, the appropriate namespace in each context being determined in some manner such (for example) as based on the name of the user connected to the database, or an explicit command to use a specific 'database'. The use of the terms known-database, known-tables or schema-decorations in this description assume that these are referenced in their appropriate namespace.

When the command to create a new database is submitted to the EPRDBMS by the client application, this is recorded by the EPRDBMS in the list of 'known-databases'.

FIG. 1 illustrates this aspect. When a command to CREATE a database is received (101), the EPRDBMS analyzes the command for syntactical correctness (102) and if there is an error in the syntax, an error message is generated (103) and the processing ends (110). If however, syntax verification is successful then the EPRDBMS inspects the list of known-databases that is part of the system metadata to determine whether a database by the specified name is already known to the system (104). If a database by the specified name is already known to the system, an error message is generated (105) and processing ends (110). If however, a database by the specified name is not known to the system, then the new database is recorded in the list of known-databases that is part of the system metadata along with any other attributes specified in the CREATE DATABASE command (106) and a suitable SUCCESS message is generated (107) and processing ends (110).

When a subsequent command to 'use' a named database is submitted by the client application, the EPRDBMS consults it's list of 'known-databases' and confirms that it knows of the existence of the specified database. If the command to 'use' a named database is found to be in order, the connection state associated with the connection will reflect the current database.

When a table is referenced as part of a command, that reference may include a specification of the database within which the table resides. If such a table reference is made, then the EPRDBMS consults its list of 'known-databases' and confirms that it knows of the existence of the specified database, and if that is successful, it attempts to resolve the reference table in that database context.

When a table is referenced without an explicit qualification indicating the name of the database, the current database associated with the connection is used and the EPRDBMS attempts to resolve the reference to the table in the current database context.

When data is stored in a table, the EPRDBMS may store additional attributes along with the attributes specified by the client application, and the additional attributes being used to identify the 'database' and 'table' context of the row being stored. These additional attributes are referred to as 'schema-decorations'.

When a command to create a new table is received by the EPRDBMS, it consults its list of known-tables to determine whether a table with a 'compatible schema' exists in any database. How this is determined, and what constitutes a compatible schema is described in the next paragraph. If it determines that there is a table with a compatible schema then the EPRDBMS records the creation of this new table, and the database context in which it was created, and the existence of a compatible schema. However, should it determine that no compatible schema exists, the EPRDBMS records the creation of this new table, and the database context in which it was created, and the fact that no compatible schema was found.

The schema of one table (call it table T1) is said to be 'compatible' with the schema of another table (call it table T2) for the purposes of the embodiments discussed herein, if the data for both table T1 and table T2 can be stored together in a single table with some additional columns (schema-decorations) such that filters on the schema decorations can uniquely identify the data that belongs to table T1 and table T2.

Consider the following two tables, T1 (A INT, B CHAR (30), C DATETIME) and T2 (A INT, B CHAR (30), C DATETIME). Then, the EPRDBMS could create a table T3 (A INT, B CHAR(30), C DATETIME, D CHAR(2)) and store the data from T1 into T3 and set the value of D to 'T1' in all those rows, and store the data from T2 into T3 and set the value of D to 'T2' for all those rows. To get at the data from 'T1', the system would simply query T3 and add the restriction "WHERE D='T1'", and the restriction "WHERE D='T2'" would give the system all the data in T2.

Consider the following two tables T1 (A INT, B CHAR (30), C DATETIME) and T2 (P INT, Q CHAR (30), R DATETIME). Then, the EPRDBMS could create a table T3 (W INT, X CHAR (30), Y DATETIME, Z CHAR (2)) and store the data from T1 into T3 by using column W for all the values of A, the column X for all the values of B and column Y for all the values of C, and set the value of Z to 'T1' in all those rows. It could then store the data from T2 into T3 using W, X and Y to store the data in P, Q and R respectively, and set the value of Z to 'T2' for all those rows. To get at the data from 'T1', the system would simply query T3 and add the restriction "WHERE Z='T1'" and alias the columns W, X and Y as A, B and C. The restriction "WHERE Z='T2'" and similarly aliasing W, X and Y as P, Q, and R would give the system all the data in T2.

For the purposes of the systems discussed herein, tables T1 and T2 as described above are 'compatible-schemas' as the system can easily construct table T3 and eliminate the duplication of tables T1 and T2 in the system.

FIG. 2 illustrates the steps involved in the creation of a new table according to one aspect herein. When a command to create a new table is received (201), the command is checked for syntactical correctness (202) and if it is found to be in error, an error message is generated (203) and the processing ends (220). On the other hand, if the command is syntactically correct, the system checks to see whether a table of this name is in the list of known-tables in the appropriate namespace (204) and if a table is found to already exist then an error message is generated (205) and processing ends (220). If on the other hand, no table by that name exists, the system checks to see whether a table with a compatible schema exists (206) and if such a table with a compatible schema exists, the association is made between the new table and the old table and data for the new table will be stored along with the old table (207) and the name of the new table is added to the list of known tables (208). The table data is now said to be stored in a 'multi-client-table'. If on the other hand, step (206) determines that no table with a compatible schema exists, processing resumes at step 208 and records the creation of a new table in the list of known tables. The table data will now be stored in a 'client-private-table'. After step 208, processing resumes at step 210 and a suitable success message is generated and processing ends (220).

When a query is received by the EPRDBMS that references (reads, writes, modifies, or deletes) a table, it consults its list of known tables and verifies that the table being referenced is on the list of known-tables in the appropriate database context. If the reference is found to be successful (i.e. that the referenced table does exist in the appropriate database context), then the EPRDBMS consults its metadata and determines whether the appropriate schema-decorations would apply to the referenced table. It then can update the query provided to it by the client with the appropriate restrictions consistent with the schema-decorations (if any), to ensure that the query only references data that is germane to the subject query.

As defined above, data for tables with compatible schemas may be stored in a single table and the EPRDBMS can distinguish rows from one table from rows from another table by applying appropriate filters on the schema-decorations, and by aliasing columns if required, all based on information it retrieves from the metadata.

FIG. 3 is an illustration of some aspects of an example EPRDBMS. Seven Storage Nodes (numbered 1 through 7, and labeled 311 through 317) are depicted. Two storage groups SG1 and SG2 are depicted. SG1(321) is associated with the first five storage nodes and SG2 (322) is associated with nodes 3 through 7. Four databases were created for client applications, and these are depicted as db01 (331), db02 (332), db03 (333) and db04 (334). The EPRDBMS recorded the creation of these databases by including them in the list of known-databases and recorded the user specified directive that the default storage group for db01 and db02 should be SG1 and the default storage group for db03 and db04 should be SG2. When the tables db01.T1 (341) and db02.T1 (342) were created, the EPRDBMS determined that they had a compatible schema and therefore stored them together in TA (351). TA is the multi-client-table used to store the data for the tables db01.T1 and db02.T1. Similarly, it determined that db01.T2 (343) and db02.T2 (344) had compatible schemas and stored them together in TP (352). TP is the multi-client-table used to store the data for the tables db01.T2 and db02.T2. db01.T3 (345) and db02.T4 (346), despite the difference in the table names and the column names were found to have compatible schemas and were stored together in TX (353). TX is the multi-client-table used to store the data for the tables db01.T3 and db02.T4. Table db01.T5 (347) was stored by itself as no tables with a compatible schema were found. db01.T5 is therefore a client-private-table. Tables db03.T1 (361), db04.T1 (362) and db03.T3 (363) were found to have compatible schemas and were stored together in TL (371), TL being the multi-client-table, and while db04.T5 (364) and db03.T5 (365) have compatible schemas, the EPRDBMS chose to store them as separate tables resulting in two client-private-tables db04.T5 and db03.T5.

When a command to alter a table is received by the EPRDBMS, the actions are similar to the actions when the table is being first created; namely to verify whether a table with a compatible schema to the new proposed schema already exists, and to create a new table with the new proposed schema if one does not exist, and to copy all data from the existing table to the new table by the appropriate application of filters based on the schema-decorations of the source table. In the event that a table with a compatible-scheme with the new proposed schema already exists the data is copied into that table, and if that table happened to be a client-private-table, it now becomes a multi-client-table. If on the other hand, no table with a compatible schema is found then the data gets stored in a new client-private-table.

FIG. 4 is an illustration of the processing involved in altering a table according to one possible embodiment. When a command to alter a table is received (401), it is first checked for syntactical correctness (402) and found to be in error an error message is generated (403) and processing ends (420). If the command is found to be syntactically correct, the system checks whether the alteration being performed renames the table (404) and if it is being renamed, the system checks whether a table of the new name already exists in the list of known-tables (405), and if a conflict is found, an error message is generated (406) and processing ends (420). If on the other hand, step 405 finds no conflict in the new name being chosen, processing resumes at step 407, and if step 404 finds that the table is not being renamed, processing resumes at step 407. The system verifies whether a table with a compatible schema to the proposed alteration already exists (step 407), and if there is, an association is established with the existing table, and any prior associations with other tables are removed (step 408), and processing resumes at step 409. If on the other hand, no compatible schema is found in step 407, a new table is recorded in the list of known tables (step 409) and a suitable success message is generated (410) after step 409 completes migrating data from the old table to the new location. As can be seen in the steps above, step 408 may cause a table that was hitherto a client-private-table to be promoted to a multi-client-table through the recording of an association of the new table with the existing table. In a similar manner, if a multi-client-table were being altered, it could result in a new table being created and that table may be a client-private-table.

The EPRDBMS may store some tables with schema-decorations and other tables without schema-decorations. The EPRDBMS may store data for multiple tables with compatible schemas in a single table, utilizing filters on the schema-decorations and aliasing to only access the data relevant to a specific query.

The EPRDBMS may further operate in a mode where data for more than one client in the multi-client database are referenced in a single query, this being done by the inclusion of filters that include schema-decorations for more than one client. One example of this would be a query that accesses all data in the database by specifying a filter on the schema-decorations that allows the query to process all data from all clients.

When the EPRDBMS stores data for multiple clients in a single table, operations that are to execute in the context of a single client are preferably executed with suitable filters based on the schema-decorations on the multi-client-table to ensure that the query only references data that is germane to the subject query.

FIG. 5 provides an illustration of this aspect. A syntactically valid query (511) referencing objects known to the EPRDBMS is received (501). The EPRDBMS consults the list of known-tables in the appropriate namespace to determine where the tables referenced in the query are stored (502). For this illustration, assume that the tables used and their storage is as illustrated in FIG. 1. The system finds (521) that table db01.T1 (141) is stored along with db02.T1 (142) in a table called TA (151). To access this data therefore, the system reconstructs the query (512) with appropriate filters on the schema-decorations and references table TA (503), and the query generated thereof is sent on for Dynamic Query Planning (504) by the EPRDBMS.

When a command to drop or truncate a table is received by the EPRDBMS, the EPRDBMS verifies that the table is on the list of known tables in the appropriate database context, and if the reference is found to be valid, it determines whether the data for the table is being stored along with data for other clients. If the EPRDBMS stores data for multiple clients in a single table, and the command received was to drop or truncate the table for a single client, the EPRDBMS would modify this query to delete the data for the client through the appropriate filters on the schema-decorations, and if the command was to drop the table then delete the table from the list of known-tables in the appropriate context.

The EPRDBMS may not immediately determine that it must store data for two tables with compatible schemas in a single underlying table, instead relying on some threshold (one of which may be a minimum number of references to a compatible schema) before data for these compatible tables is stored together. In FIG. 1, tables db04.T5 and db03.T5 (164) and (165) are shown with compatible schemas but the system has determined to store them independently.

The EPRDBMS stores data for client applications in tables that are each associated with at least one storage nodegroup, with a storage nodegroup consisting of an ordered list of storage nodes. The distribution of the data across the nodes in the storage nodegroup is defined at the time when an association between the table and the storage nodegroup is created. According to this aspect herein, the data for a single client, while appearing to the client to be in a table that is part of a database dedicated to him, may in fact reside in a table shared by multiple clients, and in fact distributed over a collection of storage nodes that are part of the EPRDBMS. The storage nodegroup associated with a table may be part of the determination of whether two schemas are compatible or not.

The client application, while attempting to create a database or table, may specify whether or not the object being created must be considered for consolidation into a multi-client object or not. This specification may be provided either as an extension to the Structured Query Language (SQL) DDL or through some other out-of-band mechanism such as the out-of-band DDL specification mechanisms described starting in paragraph [124] below.

According to this aspect herein, the client application may stipulate that a table being created should be stored as a client-private table even if there is a table with a compatible schema. FIG. 1 illustrates tables db04.T5 and db03.T5 (164) and (165). Despite the fact that they have compatible schemas, the system is shown as having stored these two as client-private tables. One way this can be accomplished is through a DDL specification indicating that the table should be client-private.

According to another aspect, a client can specify that a table being created should be shared across all clients in a multi-client system. A common use of such a table is a table listing system wide information that is of interest to all client applications. Such a table would be considered a system-wide table.

According to an aspect herein, the system may assume a default behavior when the DDL does not specify whether a table is to be either a client-private, multi-client, or system-wide. In one implementation herein, that default behavior would be to make the table a multi-client table.

CREATE [CLIENT-PRIVATE|MULTI-CLIENT|SYSTEM-WIDE] TABLE . . . ;

Accordingly the extension to the SQL DDL in one implementation is provided as above, showing the ability to specify client-private, multi-client or system-wide tables, further depicting that specification as being optional.

Query Rewrite Engine

Summary: Elastic Parallel Database Management Systems operate by storing data on a plurality of storage nodes and processing queries received from client applications by transforming them into a series of operations that the storage nodes perform in conjunction with compute nodes that are used to hold intermediate data. The series of steps that an EPRDBMS performs, called a query plan, is generated by transforming the incoming query based on the metadata stored in the system. An error in this transformation could result in serious consequences like poor performance, data loss, or incorrect results. The logic underlying these transformations is extremely complex and therefore error prone. Similar to database optimizers this transformation process is vital to the proper operation of the EPRDBMS. Methods and techniques to improve the reliability of these transformations, and the efficiency with which new transformations can be developed are presented.

The EPRDBMS herein stores user data on a plurality of database management servers (storage nodes), and executes queries received from client applications by rewriting these queries into a series of steps executed by the storage nodes and compute nodes, resulting in a result set that is then returned to the client application, as the result of the query.

The mechanism used to transform the incoming query into the query execution steps is based, among other things, on the incoming query, the manner in which data in the tables referenced by the query are distributed on the plurality of storage nodes.

Upon receipt of a query from a client application, the EPRDBMS herein parses the query and determines the complete meaning of the result set being sought by the client application. It determines the database tables being referenced and consults its metadata to determine how and where the data for those tables is stored, including the manner in which the data is distributed across a plurality of storage nodes.

The Query Rewrite Engine QRE transforms queries received into the query execution steps (QES) that represent an ordered sequence of operations that must be executed in order to produce the desired effects of the query.

The QES consists at least of (a) a set of operations that must be performed, represented in some form such as SQL, and (b) the dependency between the operations described in (a) above indicating which operations in the QES cannot be performed before some other operations in the QES are completed, and (c) the location and distribution of intermediate tables that are produced as result of the execution of some steps of the QES. In practice the Query Execution Engine (QEE) which is responsible for executing the QES may choose to execute multiple steps in the in parallel and at the same time if it determines that the dependencies of each of them have been met.

The QRE transforms each input query into an internal representation suitable for its own processing. This internal representation is called a Query Parse Tree (QPT). A QPT is a 'tree' data structure where there is a 'top level node' that produces the final results required by the client supplied query. Each 'node' in this 'tree' has an associated 'operation' and some nodes have child nodes as well. Before a node is executed, all child nodes must have been completely executed. The DQP generated by the EPRDBMS may therefore consist of a plan where multiple steps are executed at the same time.

The QPT may be represented pictorially as a 'bubble diagram'.

Each 'arrow' in the bubble diagram represents a tuple-stream (a stream of rows) and is associated with a 'geometry' (the columns in the stream) and a 'distribution' that identifies which tuples will be arriving from which storage or compute site, and going to which storage or compute site. These are some of the attributes of an arrow.

Each 'bubble' in a bubble diagram has a series of identifiers inside it depicting the kind of bubble. There are many different bubbles, performing different database primitive operations. Each bubble is associated with zero or more inputs and may produce zero or one output. Each input and output is an 'arrow' in the bubble diagram. Further each bubble has an execution locus; the place where the operation represented by the bubble is executed. These are some of the attributes of a bubble.

Once represented as a bubble diagram, it is much easier to visualize the operations of a QRE. The QRE makes transformations of the QPT based on specific rules. These rules may be applied on individual bubbles, individual arrows, or groups of bubbles and arrows, and these rules may be applied based on the attributes of the bubbles and the arrows. Rules may be applied unconditionally or conditionally.

The rules used by the QRE (Query Rewriting Rules or QRR) are specified to the system in some manner understood by the QRE. These rules may be changed dynamically, and a change to the QRR will result in a change in the way the QRE performs rewrites.

The QRR consist of zero or more actions that must be executed in a manner specified in the rule in order to perform the actions intended by that rule.

Each rule has an associated priority and if the QRE determines that it needs to execute multiple QRR's, it uses the priority associated with the rule to determine the sequence of execution.

Some actions modify the tree, and some actions modify the geometry of a stream (input or output). These are some of the attributes of an action.

The QRE executes rules in multiple passes, some passes traversing the bubble diagram from the top to the bottom and others from the bottom to the top. The direction of the pass (up or down) is also used to determine the rules that must be executed. In the top-to-bottom pass, analysis begins at the node that produces the final results of the query or the node that produces no output stream (in the case of queries that produce no results). In the bottom-to-top pass, analysis begins at the nodes that have no dependencies and proceeds sequentially through the entire parse tree analyzing nodes whose dependencies have already been analyzed and culminates at the node that produces the final results of the query, or the node with no output stream (in the case of queries that produce no results).

Having transformed an input query into a QPT, the QRE executes the appropriate rules for the QPT, and this execution results in the QES.

This is illustrated with a simple example. Consider the following query:

SELECT T1.A, T2.B FROM T1, T2 WHERE T1.P=T2.Q;

FIG. 6 shows the bubble diagram for this query. Bubble 601 depicts the scan on table T1; Bubble 602 depicts the scan on table T2. Arrows 603 and 604 represent the streams emanating from bubbles 602 and 601 respective. Stream 603 consists of the columns B and Q from table T2 and Stream 604 consists of columns A and P from table T1. The distribution of the stream is indicated in this diagram by the underlined attribute; in Stream 603 the distribution is on column Q and in Stream 604 the distribution is on column P. These are both inputs into bubble 605, the join bubble based on the condition t1.P=T2.Q. Bubble 605 has one output, and that is the stream 606 consisting of the values of A and B.

A top to bottom pass of this QPT would begin at arrow 606 and then go to bubble 605, and then follow arrow 604 to bubble 601, then resume at arrow 603 and follow it to bubble 602.

A bottom to top pass of this QPT would begin at bubble 601 and traverse arrow 604 but determine that bubble 605 has other pre-requisites, and therefore resume at bubble 602 and traverse arrow 603; then determine that all prerequisites of bubble 605 have been traversed, and therefore resume at bubble 605, and then proceed to arrow 606.

For the purposes of this paragraph, assume that tables T1 and T2 are both distributed according to some EDD, and co-located for the purpose of the join T1.P=T2.Q. A query rewrite-rule applied to the join bubble 605 would, for example, ensure that the distribution of the incoming streams is consistent with the join condition. In this example, it would determine that the stream 604 was distributed according to the distribution column of T1 (T1.P) and that the stream 603 was distributed according to the distribution column of T2 (T2.Q), and that this was consistent with the join T1.P=T2.Q.

On the other hand, assume for the purposes of this paragraph that tables T1 and T2 are not co-located for the purposes of the join T1.P=T2.Q. A query rewrite-rule applied to the join bubble 605 would, for example, ensure that the distribution of the incoming streams is consistent with the join condition. In this example, it would determine that the stream 604 was distributed according to the distribution column of T1 (T1.P) and that the stream 603 was distributed according to the distribution column of T2 (T2.Q) and that this was not consistent with the join T1.P=T2.Q as the distribution methods for T1 and T2 are not the same. In that case, the QRR would perform a translation to the bubble diagram in order to make the inputs to the join consistent with the join condition.

FIG. 7 shows one such translation that may be performed by a QRR as described in the preceding paragraph. Bubble 701 represents a scan on table T1 and arrow 704 represents the output stream from the scan bubble 701, and it consists of columns A and P distributed according to attribute "A" as depicted by the underlined character. Bubble 702 represents a scan on table T2 and arrow 703 represents the output stream from the scan bubble 702, and it consists of columns B and Q distributed according to the elastic distribution method of table T2 which is column "Q" as depicted by the underlined character. Bubble 707 is a redistribution of the stream 704, and has an output stream 708 and stream 708 is distributed according to the elastic distribution method of table T2 on column (T1.P) and depicted by the underlined character. The join bubble 705 has two inputs, the streams 708 and 703, and has one output which is the stream 706.

According to the translation in FIG. 7, the inputs of the join bubble 705 (708 and 703) are distributed in a manner consistent for the join, and is therefore something that the EPRDBMS can execute in parallel.

The translation described in the paragraph above is an example of a translation that modifies the QPT. Similarly translations can change the geometry of a stream when required.

As described above the Query Rewrite Rules may be provided to the QRE in a form understood by the QRE, and specifying the actions, the priorities, and other information required by the QRE in determining the correct rules to be applied and the sequence in which those rules should be applied to the QPT's. For the purposes of illustration, a simple text file was used.

An example of the rules for a Full Outer Join bubble is provided as FIG. 8. Rules may include some key attributes including the name, prerequisite rules, the inputs to the rule, the outputs from the rule, and attributes of the rule such as whether the rule modifies the tree or the geometry, and any external references from the rule. Each rule contains zero or more actions. Each action could specify a priority and the steps to be performed for the action. Comments may also be specified and in the example set of rules, comments are depicted by lines where the first non-whitespace character is the '#' character. An action in a rule may also reference the current bubble using the special keyword 'this'. The actions are specified in a language that allows for the definition of variables, conditional operations, branching, loops and transfer of control. The language also supports the definition of functions that perform some specified operation. In the illustration, a function IS_JOINABLE is shown and it operates on two streams (in this example, the two inputs to the FOJ bubble). The function IS_JOINABLE would compare the geometries of the two streams and return the logical values TRUE or FALSE.

FIG. 9 illustrates the function IS_JOINABLE and illustrates several aspects herein. Functions are defined in a form and format that is understood by the QRE and for the purposes of illustration, a simple text file was used. The function is named IS_JOINABLE and takes three parameters (a join-condition, and two streams) and returns a Boolean. The functions are specified in a language that allows for the definition of parameters, return values, variables, conditional operations, branching, loops and transfer of control. The language also allows functions to reference other functions.

The QRE transforms a QPT into QES according to rules defined in the QRR. The EPRDBMS herein provides a mechanism that can be used to instruct the DQP to reload a new set of QRR. One such mechanism is an extension to the SQL language understood by the EPRDBMS. By way of illustration, the command could instruct the system to load new rules either for the system as a whole, for the current session, or for some other group of users, sessions or duration.

[RE]LOAD RULES [FOR SESSION|SYSTEM] FROM <PATH>;

An example of such a command is provided above.

Platform Agnostic Resource Provisioning

Summary: It is necessary for an EPRDBMS to be able to operate on multiple platforms, each with their own peculiarities and specializations, and in some instances on multiple platforms at the same time, shortcomings in existing database management system architectures are exposed. Current architectures assume homogeneous operating environments, and often require highly controlled configurations (such as is the case with database 'appliances') and these limitations pose series impediments to cross-platform and multi-platform operation. Methods and techniques for implementing an EPRDBMS on a plurality of execution environments (platforms) are presented.

According to one aspect of the system described herein, once the QRR has completely transformed the QPT into a QES, the Query Execution Engine (QEE) determines how many compute nodes are required for each of the steps in the QES, and provisions the appropriate compute nodes from the compute nodegroup associated with the connection.

Compute Elasticity in the EPRDBMS is achieved through the dynamic provisioning of compute nodes in the compute nodegroups associated with the client connections to the system. The EPRDBMS herein allows a different compute nodegroup to be associated with each connection, while also allowing a compute nodegroup to be shared among some or all the connections to the system at any given instant. In response to system load and other preset conditions, the system may adapt the membership in compute nodegroups to achieve compute elasticity.

The mechanism for provisioning a new compute nodegroup is dependent on the operating environment (platform) on which the EPRDBMS is running.

For example, when run in an environment such as the Elastic Compute Cloud environment provided by Amazon, the mechanism would involve a specific sequence of API calls. And when run in an environment such as the Joyent Cloud provided by Joyent, the mechanism would be different. Finally when run in one's own data center, the mechanism would be different still.

According to the present invention, as depicted in FIG. 10, the Query Execution Engine (1011) of the EPRDBMS (1010) interfaces with the Compute Node Plugin (1020). The Compute Node Plugin provides Application Programming Interfaces (API) for the Query Execution Engine to invoke, and these API's include Node Request (1011) and Node Release (1012). When the Query Execution Engine determines that a query requires a compute node, it makes the request of the Compute Node Plugin providing information as required by the API exposed by the Plugin. The Compute Node Plugin implements the API's using a Controller (1014), a Policy Manager (1013), a Monitoring Manager (1015) and manages information about nodes using a Node List (1016) and Node Utilization (1017). The Compute Node Plugin provisions resources from the Platform (1030) by invoking some API's exposed by the Platform (1021), (1022), (1023) and (1024). The Policy Rules implemented by the Policy Manager are specified in some format required by the Policy Manager (1040).

The Controller (1014) in the Node Plugin responds to a Compute Node Request (1011) which may request one or more nodes and provide additional information about the kind of node(s) being requested. More particularly, the Compute Node Plugin determines which of the nodes that it has already provisioned, and is tracking in the Node List (1016), and which could be allocated to the requestor. When a Query Execution Engine is provided one or more nodes in response to a request, this is recorded by the controller in the Node List.

The Controller (1014) in the Node Plugin, in response to a Compute Node Release (1012), updates its Node List to record the fact that the Query Execution Engine is no longer using the Compute Node(s) being released.

Platforms may expose API's that allow for the monitoring of utilization and the price of resources at any given instant of time. The Monitoring (1015) makes use of API's provided by the platform to gather information about instance utilization and pricing and updates the Node Utilization table.

The term 'instance' used in the previous sentence and in the following paragraphs is very closely related to the term 'node' but not exactly identical. Cloud environments (platforms) allow requestors to provision machines and these machines are referred to as instances. An instance is therefore a virtual machine or physical machine provisioned by the platform in response to a request from a user of the platform. In the context of an EPRDBMS, a Node is a collection of software programs running on one or more machines. In order to instantiate Compute Nodes that are being requested by a Query Execution Engine, the Compute Node Plugin manages a pool of instances on which software programs are running and provides these to the Query Execution Engines as Compute Nodes.

For example, in the Amazon EC2 cloud environment (platform), the API call DescribeSpotPriceHistory API call allows a requestor to find out the current price for a node based on specific parameters. Similarly, the Amazon EC2 API provides such interfaces as RunInstances, StopInstances, and StartInstances, to control the state of an 'instance' in their cloud. The Monitoring may also inform the platform of the status of a running instance using the ReportInstanceStatus API call. Also the EC2 API provides for mechanisms to monitor such run time utilization elements as CPU Utilization, Disk Reads and Writes, and Memory utilization.

However, other cloud environments (platforms) may provide different API's for these purposes, or in some cases may not provide some of this functionality, or may provide additional functionality.

The Controller periodically reviews the utilization of instances that have been provisioned from the platform, and based on various Policies (1013) determines the optimum number of instances that must be maintained in the Node List at any time. Policy may stipulate such things as a minimum number of Compute Nodes to maintain at any time, and a maximum number to maintain at any time. Optionally, Policy may stipulate a maximum cost per time period for all compute nodes that are to be maintained, and the Controller uses information from Pricing Information (1024) to implement this policy. Some platforms further have billing rules such as "billing frequency" where instances are billed in blocks of some number of minutes, hours or days. For example, instances in the Amazon Cloud are billed by the hour. Therefore if an instance is provisioned in the Amazon EC2 cloud in the "On Demand" model, the amount that will be paid for this instance is determined by the formula:

COST=CEILING(UPTIME IN HOURS)*RATE where CEILING(x) is defined as:
  x if x is a whole number of hours, or
  the next largest whole number greater than x if x is not a whole number of hours.

Similarly, in the Amazon Cloud, if instances are provisioned in the "Spot Instance" model, the RATE can change at any time and it is up to the Controller to ensure that the Policy is still respected.

Policy may specify rules in the form of absolutes (cost per hour not to exceed a certain amount) or in the form of soft-conditions (target cost per hour not to exceed a certain amount). In the latter case, the controller is allowed the flexibility to violate the policy in some circumstances which may also be specified in the policy.

An EPRDBMS may be configured to operate with multiple platforms simultaneously. Each platform may have different API's, capabilities, and pricing. This is depicted in FIG. 11. The EPRDBMS (1110) and its Query Execution Engine (1101) interacts with a Compute Node Plugin (1130) which has been provided Policy Rules (1120). The Compute Node Plugin has been instructed (through Policy Rules) to provision instances on Platforms 1, 2 and 3 (1150, 1160 and 1170).

QEE (1101) makes requests to the Compute Node Plugin (1130) using the API's (1131) provided by the Compute Node Plugin. The various elements of the Compute Node Plugin (1130) are analogous to, and perform the same functions as their equivalent elements in FIG. 10.

Policy Rules (1120) instruct the Compute Node Plugin (1130) how and when to provision instances from each of the platforms. The Compute Node Plugin interacts with each platform using the API's exposed by that platform (1151, 1161 and 1171). As each platform may provide a different API, the Compute Node Plugin provides a layer of abstraction between the EPRDBMS and the various platforms, and the mechanism to implement a policy across a plurality of different platforms. The QEE may request compute nodes from a particular platform and these requests are provided as part of the API calls supported by the Compute Node Plugin. These preferences from the QEE may be either requirements that the Compute Node Plugin must honor, or recommendations that the Compute Node Plugin may honor at its sole discretion.

The EPRDBMS can allow for the specification of the policy rules in some format(s) such as, for the purposes of illustration but not limitation, a plain-text file or an XML file.

Further, the invention provides for a mechanism whereby a user may modify the policy rules dynamically through the use of some mechanism(s). One such mechanism is an extension to the SQL language understood by the EPRDBMS. A SQL command such as the one shown below may be used to reload policy rules for the system, for the present connection, or specify some other scope for the new policy rules.
[RE]LOAD POLICY RULES [FOR SESSION|SYSTEM] FROM <PATH>;

Smart Distributed Transactions

Summary: The cost and complexity of managing consistency in a distributed system have led to entire architectures that espouse "relaxed consistency" or entirely eschew the ability to preserve transaction consistency. Often the "CAP Theorem" is used to justify these simplifications. In practice however, a large class of commercial applications require the ability to perform operations as "atomic transactions" where either the entire multi-step operation is performed, or none of the operation is performed, but never just a proper subset of the operation. Successful implementation of these semantics in a distributed database management system often come at a high cost. These algorithms are particularly insufficient for application in systems such as elastic parallel database management systems where data is not only distributed but also often stored in a myriad of complex distribution patters for optimum query processing. Methods and techniques are presented to ensure data integrity and transaction consistency in a parallel database management system while dramatically reducing some of the inefficiencies common to conventional algorithms.

The Elastic Parallel Relational Database Management System (EPRDBMS) herein distributes data and query processing across a plurality of database management systems. When applications submit queries to the EPRDBMS, the system translates these queries into a series of steps that must be executed on some or all of the underlying database management systems, in a specified sequence, in order to accomplish the intent of the input query.

A class of SQL queries modify data in a database; these include DELETE, INSERT, UPDATE, and TRUNCATE. Further, the semantics of Relational Database Management Systems provide for a "logical transaction" which is a collection of operations that must be performed on the database and where the guarantee is that either all the operations must be performed, or none of the operations are performed, but never that some but not all of the operations are performed. This is known as database atomicity and this kind of logical transaction is often referred to as an 'atomic operation'. This is particularly important in the case of systems where multiple operations are performed on different data elements that must be retained consistent within the database.

In a distributed database, techniques for "distributed transactions" are commonly employed and one popular technique for this is the "two-phase-commit" (2PC). According to the rules of a 2PC, each participating node in the distributed database is informed when a transaction is about to start, and then a series of operations that form the transaction are performed. Then a component of the 2PC system called a transaction-coordinator informs all nodes that they should "prepare to commit". In response to a message to "prepare to commit" all nodes must perform any and all operations that they require in order to guarantee their ability to commit the operation if so instructed. If a node is not able to guarantee that it can commit the operation, it shall respond to the transaction coordinator with a suitable response indicating such inability. Otherwise, it may respond with a response indicating that it is "prepared to commit". If the transaction coordinator receives a successful response to the "prepare to commit" command from all participating nodes, then it may inform them that they should "proceed to commit". Upon receiving a "proceed to commit" command, all nodes should commit the transaction and reply to the transaction coordinator. It is a violation of 2PC for a transaction coordinator to force a "proceed to commit" if any participating node replied with an error in the "prepare to commit" phase. It is a violation of 2PC for a participating node to fail to commit when it receives a "proceed to commit" command, if it previously replied with an affirmative response to the "prepare to commit".

Distributed transactions come at a premium because of the additional messaging that is required between the various participating entities; the transaction coordinator and the nodes participating in the transaction, and the fact that there is no opportunity for parallelism amongst the various operations involved; the prepare-to-commit and all responses must complete before the proceed-to-commit begins.

The EPRDBMS described herein provides several ways in which database tables may be distributed across the plurality of storage nodes that are part of the system. According to one aspect, each table is associated with at least one storage group, and an association with the first storage is established at the time when the table is created. Furthermore, each table may be associated with more than one storage group, and the data for the table may be distributed in a different way across the storage nodes that are part of each of the different storage groups, the association between a table and its first storage group and the distribution of data on the first storage group being defined at the time when the table is created. At a later time, a table may then be associated with the same or different storage groups, and those associations would specify the data distribution on the newly associated storage group. Further, different tables in the EPRDBMS may be associated with different storage groups.

During query processing, the DQP may find it advantageous to use one distribution of a tables' data in preference to another one, such a determination being made based on the query or queries being processed and the operations that are being performed in those queries. Since the system will maintain a representation of data in the table such that changes are made in a transaction consistent manner, the DQP is free to choose the distribution and storage nodegroup that is best and the results of the query would be identical if a different one were chosen. Without loss of generality, the same query planning methods used if a table had only a single nodegroup association may be used if there are multiple storage nodegroups associated with the table except that the DQP now has more options to consider in picking the preferred QES.

FIG. 12 provides an illustration of this. Seven storage nodes (1211, 1212, 1213, 1214, 1215, 1216 and 1217) are part of this illustration. There are four Storage Groups defined, SG1 including Storage Nodes 1211, 1212 and 1213, SG2 including nodes 1213, 1214 and 1215, SG3 including 1214, 1215 and 1216 and SG4 including 1215, 1216 and 1217. There is no requirement that storage groups must all have the same number(s) of nodes, or that the nodes be consecutively numbered. These choices were only made for ease of illustration. Five tables (1231, 1232, 1233, 1234 and 1235) are also shown. Table T1 (1231) is Broadcast distributed on SG1. This implies that the system will maintain a consistent copy of T1 on all nodes that are part of SG1. Table T2 is distributed according to an Elastic Data Distribution (EDD) on SG2. This means that the data in T2 is divided based on some deterministic policy, and a part of the data is stored on each of the Storage Nodes that are part of SG2. Table T3 is EDD on both SG2 and SG3 which means that a copy of the data in T3 is EDD on SG2, according to some deterministic policy and an identical copy of the data is broadcast on SG3. The system further guarantees that the two copies of data in T3, one on SG2 and one on SG3 are maintained "transaction consistent". Similarly Table T4 is EDD and associated with SG1 and SG3 and distributed according to EDD on SG1 and EDD on SG3. Finally T5 is EDD and associated with SG4.

When a table is associated with multiple storage groups, a copy of the data is stored on the nodes that are part of each storage group. If, as is the case with table T3 which is associated with SG2 and SG3, a copy of the data is stored on SG2 (distributed according to EDD), and a copy of the data is stored on SG3 (Broadcast). In practice this means that Storage Nodes 3 will have a slice of the data for Table T3 because Storage Node 3 is part of SG2. Storage Node 4 will have a slice of data for table T3 because it is part of SG2 but it will also (in addition) have a complete copy of the data for table T3 because it is part of SG3. Finally, Storage Node 5 will have a slice of data from T3 because it is part of SG2 and will have (in addition) a complete copy of T3 because it is part of Storage Group 3. Finally Storage Node 6 will have a complete copy of T3 as it is part of SG3.

As copies of data for a table may be maintained on a plurality of storage nodes, a change to a table may require changes to be made to data on multiple storage nodes in a transaction consistent manner. When a logical transaction is performed by a series of queries, the changes that are part of the logical transaction would, similarly, have to be made to multiple storage nodes in a transaction consistent manner.

FIG. 13 illustrates the mechanism(s) which may be used to maintain this transaction consistent view of the data while also minimizing the occurrence of distributed transactions. Client application software (1301) connects to the EPRDBMS. The Controller Node of the EPRDBMS (1301) includes various components (1302, 1303, 1304, 1305, 1306, 1307, 1308 and 1309) and also consists of some Nodes (1350, 1360, 1370 and 1380).

When an application connects to the EPRDBMS, the transaction state associated with the connection (1309) is initialized to an initial state.

The Dynamic Query Planner (1302) analyzes each of these operations and based on information obtained from the Catalog Metadata Manager (1306) and the Metadata (1308), generates Query Execution Steps that are an ordered sequence of operations that must be performed by Query Execution Engine (1307) in order to accomplish the intent of the query submitted by the application. When an operation that modifies data on the storage nodes is received by the EPRDBMS, the Transaction State (1309) associated with the connection (1309) is updated to reflect this. During the course of the transaction each operation that modifies data on the various Storage Nodes causes updates to the Transaction State (1309) indicating the Storage Nodes where data was modified.

In the case of tables that are distributed according to an Elastic Data Distribution (EDD), if the SQL queries that modify data include information that help the DQP identify which storage nodes may have data that needs to be updated by the query, this information is used in the DQP process in generating the QES on the minimum number of Storage Nodes required for the operation.

In the EPRDBMS, tables are associated with one or more storage groups. Data for a single table may therefore be stored on more than one storage node.

For example, if an UPDATE is made to table T3 and the DQP can determine that the change will affect the slice of data stored on Node 3 due to the distribution of data according to EDD on SG2, the QES would include operations to update the data on nodes 3, 4, 5 and 6 because a broadcast copy of the data is stored on SG3 which resides on nodes 4, 5 and 6. This would imply that the transaction state associated with the connection would then be reflected to indicate that the change was made on storage nodes 3, 4, 5 and 6.

On the other hand, if an UPDATE is made to table T3 the DQP can determine that the change will affect the slice of data stored on Node due to the distribution of data according to EDD on SG2, the QES would include operations to update the data on nodes 4, 5 and 6 because a broadcast copy of the data is stored on SG3, which resides on nodes 4, 5 and 6. This would imply that the transaction state associated with the connection would then be reflected to indicate that the change was made on storage nodes 4, 5 and 6.

For example, if an operation was performed that UPDATED data in tables T2 and T5 within a single transaction, and the DQP was able to determine that the change to T2 would affect the data on the slice on storage node 5 and the change to T5 would affect the data on the slice on storage node 5, then these two operations would both update the transaction state to indicate that the only changes that had been made affected storage node 5.

If the application indicates that transaction is to be "committed", the DQP inspects the transaction state associated with the connection and determines the number of Storage Nodes on which data was modified, and that needs to be "committed" in a transaction consistent manner.

If it determines that the transaction need only be committed on a single storage node, it can issue a simple directed commit to the single storage node. If it determines that the transaction needs to be committed on multiple storage nodes, then it begins the process of distributed transaction on the storage nodes that have modified data.

Once the transaction is successfully committed, the transaction state associated with the connection is cleared to an initial state.

If the application indicates that the transaction needs to be aborted or "rolled back", the DQP inspects the transaction state associated with the connection and determines the number of Storage Nodes on which data was modified, and that needs to be "rolled back" in a transaction consistent manner.

If it determines that the transaction need only be rolled back on a single storage node, it can issue a simple directed rollback to the single storage node. If it determines that the transaction needs to be rolled back on multiple storage nodes, then it begins the process of distributed transaction on the storage nodes that have modified data.

Once the transaction is successfully rolled back, the transaction state associated with the connection is cleared to an initial state.

In the example in paragraph [114] above, a commit or rollback from the application would translate into a distributed commit or distributed rollback on storage nodes 3, 4, 5 and 6. In the example in paragraph [115] above a commit or rollback from the application would translate into a distributed commit or rollback on storage nodes 4, 5 and 6. Finally, in the example in paragraph [116] above, a commit or rollback from the application would translate into a directed (local or non-distributed) commit or rollback on only storage node 5.

Out-of-Band Specification of System Metadata During DDL Operations

Summary: Parallel Database Management Systems have traditionally required the specification of some additional information to be used in determining data placement. These specifications take the form of extensions to the Data Definition Language (DDL) and therefore necessitate a change in the application that wishes to utilize the Parallel Database Management System. Such changes are costly and sometimes infeasible thereby impeding the migration of applications from an SMP database to an EPRBMS. Methods and techniques are presented that allow an unmodified application to be migrated to operate on parallel database management system through the definition of an out-of-band mechanism for metadata specification.

The Structured Query Language (SQL) includes a Data Definition Language (DDL) that is used to define the various objects that are stored in a relational database. For example, the CREATE TABLE command is used to create a table, and define the columns in the table and their data types and other attributes.

For example, the below statement creates a table T1 with three columns A, B and C, and A is an integer, B is a 10 character string and C is a datetime. Further, the DDL defines A and B to be "NOT NULL", meaning that no row in that table is allowed to exist with a NULL value in either column A or B.

```
CREATE TABLE T1 (
    A INT NOT NULL,
    B CHAR (10) NOT NULL,
    C DATETIME );
```

In addition to specifying the geometry of the table (the columns, their data types and any additional attributes), the DDL syntax may be extended to include the specification of other information, as described below.

Some Parallel Database Management Systems have extended this syntax by allowing the specification of data distribution. For example, the EPRDBMS herein defines the following extension to the SQL Standard DDL Specification for CREATE TABLE as.

```
CREATE TABLE T1 (
    A INT NOT NULL,
    B CHAR (10) NOT NULL,
    C DATETIME )
    DISTRIBUTE ON (A);
```

In this extended syntax, the DDL defines a table T1 with three columns A, B and C and indicates that the data is to be distributed according to an Elastic Data Distribution method based on the values of column A. As no storage group was specified, the default storage group associated with the database will be used. This extension to the DDL syntax is an "in-band" specification of the distribution information.

The EPRDBMS herein augments the DDL Specification in one other way, and that is through the specification of "out-of-band" commands as part of the DDL.

When out-of-band DDL extensions are enabled with the EPRDBMS, the administrator provides the EPRDBMS with these out-of-band commands in a form and format defined and understood by the EPRDBMS. This may be in the form of a simple text file, or maybe some other format.

FIG. 14 illustrates this. When a new SQL Query is received by the EPRDBMS (1401) it first checks to see whether the query is a DDL (1402). If it is not, it proceeds with DQP (1403). On the other hand, if it is a DDL, it looks to see whether there is an out-of-band specification (1404). If there is one, it augments the DDL (1405) and proceeds with DQP (1403), and if there is not one, it proceeds with DQP directly.

When a system is first installed and initialized, a global set of out-of-band definitions may be provided to the system. These out-of-band definitions (if specified) are consulted on every DDL operation performed on the system. One kind of DDL operation is the "CREATE DATABASE" command. When the CREATE DATABASE command is executed, out-of-band definitions in the system-wide specifications are consulted, and if appropriate, the CREATE DATABASE command is augmented with some out-of-band specifications.

The EPRDBMS can further extend the syntax of the CREATE DATABASE command to allow for the specification of a set of out-of-band definitions to be used when DDL is executed in the context of that database.

When DDL is executed in the context of a database (such as the CREATE TABLE command), the EPRDBMS herein first consults the system-wide out-of-band definitions (if specified) and attempts to augment the DDL statement, and then consults the database specific out-of-band definitions (if specified) and attempts to further augment the DDL statement before arriving at a fully augmented DDL statement that is then executed.

Augmentation rules may be specified in the system-wide specifications and in the database-wide specifications. Depending on the specifications, the EPDBMS may either override one set of specifications in favor of the other, or apply some operation to merge the specifications provided in both places, or apply some other scheme to determine which set of augmented specifications to apply and which to ignore in each instance. To facilitate this, the specifications are defined in a manner that includes an identification (such as a name), and other attributes like priorities and other guidelines.

Some augmentation specifications may have some prerequisites and required follow-on. Augmentation specifications can specify prologues and epilogues. When a DDL command is received by the EPRDBMS, and a compatible out-of-band specification is found, if that out-of-band specification contains a prologue rule, the prologue is not immediately executed but rather added to the list of commands to be executed, ahead of the present DDL. Similarly, if an epilogue is found, it is not immediately executed but rather added to the list of commands to be executed, after the present DDL. The prologue and epilogue DDL are also processed to determine whether they require additional out-of-band specifications or not, and it is possible to specify that an out-of-band specification is 'terminal' in that it should not be further augmented. The 'terminal' specification is an example of an attribute of an augmentation that allows the EPRDBMS to determine the exact sequence of commands to execute in response to an incoming DDL when multiple augmentations are specified.

FIG. 15 provides an example of an out-of-band specification. This specification is part of a text file that is provided to the EPRDBMS, and shows the definition of a single out-of-band specification. This specification is called CUSTOMER-TABLE and this name (1501) can be used by other specifications to refer to it. The second line (1502) defines an OVERRIDE indicating that this specification overrides a specification by the name SYSTEM.CUSTOMER-TABLE. The TABLENAME directive (1503) indicates that this specification applies to any table named '*CUSTOMER' where '*' is the wild-card character. In other words, any table with a name ending in the word CUSTOMER would be augmented by this specification. The SIGNATURE directive (1504) further restricts the applicability of this specification to tables that match the specified signature. A signature of a table is generated by performing some deterministic operation defined by the EPRDBMS on the geometry of the table and provides a simple way to restrict a specification to tables with a particular geometry. As software applications may change the schema of a table from release to release thereby altering the signature, this mechanism allows the specification to target a specific schema of a table. The PRIORITY directive (1505) helps the EPRDBMS to sequence this augmentation specification among a group of augmentations that may be determined to be required. The PROLOGUE (1506) directive informs the EPRDBMS that the SPECIFICATION to follow has a prerequisite and that prologue is specified next. The syntax specified by the EPRDBMS for this format of the out-of-band specifications indicates that a ';' or semi-colon character will be used to end the PROLOGUE statement. The PROLOGUE itself is provided (1507, 1508). The out-of-band specification (1509) directive provides the augmentation that must be made to the DDL specification matching this particular rule, and the augmentation in this case is provided (1510). The END directive (1511) indicates that this ends the out-of-band specification CUSTOMER-TABLE.

The SPECIFICATION section may define multiple actions such as to REPLACE, APPEND, ALTER or perform some other modification to the DDL that is being augmented by the out-of-band specification. The EPRDBMS may assume a default action if none is provided, and the default action is defined by the EPRDBMS.

The EPRDBMS herein thus provides for a mechanism whereby a user may modify the out-of-band metadata specifications dynamically. One such mechanism is an extension to the SQL language understood by the EPRDBMS.

[RE]LOAD OOB METADATA [FOR SESSION|SYSTEM] FROM <PATH>;

A SQL command such as the one shown above may be used to reload out-of-band metadata specifications for the system, for the present connection, or specify some other scope for the new policy rules.

Extended Generational Data Distribution Methods

Summary: Elastic Parallel Database Management Systems achieve storage elasticity through a technique described as a generational data store. The placement of data on a storage nodegroup is determined by use of this generational mechanism that allows for changes in the enrolment in the storage nodegroup while simultaneously ensuring data co-location. Methods and techniques for extending the generational placement algorithm are provided to allow for the optimum placement of data on multiple nodes, and providing for the ability to migrate specific data from one node to another while still ensuring co-location.

The EPRDBMS utilizes Elastic Data Distribution (EDD) methods to distribute data over multiple nodes in a group in a deterministic manner to ensure co-location.

One aspect of this approach is a 'generational' data structure, where each generation includes a Distribution Map (DM) that is used to determine what DV's were not seen when the subject generation was the current generation of the EDD.

When an EDD is created, it is in its 'first generation' and an empty DM is created. To determine whether a particular DV was seen before or not, a sequential scan is conducted of the DMs beginning with the first DM and progressing till the current generation of the EDD or the first DM where it cannot be determined with certainty that the subject DV was not seen.

The EPRDBMS may add a new generation at any point in the sequence of generations, not necessarily after the current generation. According to this aspect, the EPRDBMS may create a new generation ahead of the 'first generation' giving rise to a new 'first generation'. The EPRDBMS may also create a new generation and insert it between two existing generations.

When presented with a row of data to be stored into a table distributed according to an EDD, the EPRDBMS can sequentially scan the DM's of the EDD starting with the first generation until it either (a) encounters a generation where it cannot determine for sure that it has not seen the subject DV when that generation was the current generation, or (b) reaches the current generation.

and the EPRDBMS will store the row of data as it would have if that generation was the current generation. If a new generation (A) is created and inserted between two existing generations (B) and (C), then the sequential scan would progress through these generations first inspecting generation (B), then generation (A) and finally generation (C). If a new generation (A) is created and inserted before the current first generation (B), then the sequential scan would commence with generation (A) and then proceed to generation (B).

FIG. 16 illustrates the effects of introducing a new generation between two existing generations. In this illustration, the EDD has a DV consisting of two integers. For simplicity, this illustration assumes that each generation in the "Before" scenario uses a bitmap of 13 bits. The scenario is represented as a "Before" view on the left (1651) and the "After" view on the right (1661). In the "Before" view, five generations are depicted, these are Generation 1 through 5 sequentially captioned (1601) through (1605) and each generation has its DM sequentially captioned (1621) through (1625). In the "After" view, there are six generations, and these are Generation 1 through 6 sequentially captioned (1611) through (1616), and each generation has its DM sequentially captioned (1631) through (1636). The newly added Generation 4 (1614) is labeled as such (1610). The DV (17, 4) when mapped according to the rules of this EDD into a bitmap representation such as (1621) through (1625) or (1631) through (1633), (1635) or (1636), produces a representation that is shown at the bottom left of the illustration and is labeled (1671). According to this illustration, the newly added generation "Generation 4" (1614) has a DM which is a simple list of DV's and includes the single DV (17, 4).

According to this aspect, the EPDBMS may relocate all instances of a given DV but following the process below:

(a) Identify the first generation in the current list of generations where it cannot be determined for sure that the subject DV was not seen when that generation was the current generation, and (b) Insert a new generation at any point before that generation with a DM that would indicate that it could not be determined for sure, that the subject DV was not seen when that generation was the current generation, and (c) Associate with that newly created generation, an allocation strategy that would cause all rows with the subject DV to be placed in the location where the EPRDBMS would like to relocate this DV, and (d) Move all rows with the subject DV to the new location.

As depicted in FIG. 16, the bits that would be set in the DM (bitmap) for the subject DV (17, 4) are as shown in (1671) and the first Generation where it cannot be determined for sure that the subject DV was not seen when the subject generation was the current generation is Generation 4 (1604) in the "Before" scenario. Therefore, the EPRDBMS inserts a new Generation 4 (1614) before the old Generation 4 (now Generation 5 in the "After" scenario and labeled (1615) and associates with the new Generation 4, a DM (1634) that simply indicates that the only DV ever seen was the subject DV (17, 4), and then proceeds to relocate all data with the subject DV to the desired location. In this manner, any subsequent occurrence of the DV (17, 4) will be dispatched according to the new Generation 4 (1614).

According to another aspect of the system described herein, the EPRDBMS may choose to relocate multiple DV's and it would do so either by repeating the process described above multiple times, one for each DV or create a single generation that would dispatch all of the DV's to be relocated using a single new generation and a suitable DM, the subject new generation being inserted into the chain of generations at any point ahead of the first generation where it cannot be determined for sure that any one of the subject DV's had not been seen when the subject generation was the current generation. The degenerate case of this insertion would be to always create a new generation ahead of the current first generation, thereby creating a new "first generation", and performing the relocations of the existing data matching the subject DV's.

The newly created generation may have a DM of any form and that the DM in one generation may have a form and format different from the form and format of the DM in any other generation.

Container Based Data Distribution

Summary: Advanced methods for distributing data in a parallel database management system suitable for certain classes of complex schemas are presented. Parallel database management systems have long provided the benefits of parallelism through the distribution of data across a plurality of servers and by having each server process queries based on its subset of the data while having all servers process these queries in parallel and at the same time. Data distribution, the algorithms that determined where to store a row of data for optimum query processing, invariably depended on some attribute in the row of data (a column, or a group of columns). In some classes of schema that are commonly in use today, this mechanism is insufficient. One class of schemas is the hierarchical schema generally referred to as "person-child-grandchild" referring to the relationship between entities in a database that mirror this familial relationship. For optimum query processing performance, one would like to store the person entity, the child entity and the grandchild entity on the same node in the parallel database but schema optimization techniques such as normalization prevent the grandchild entity from having an attribute for the person entity thereby making it impossible to achieve optimal distribution and a normalized schema at the same time. The techniques described herein create a new class of distribution methods that make this possible.

In an EPRDBMS, data in tables is distributed across multiple nodes that are members of a storage group or storage groups associated with a table. In data dependent distribution methods that provide co-location, rows in tables with identical values for the Distribution Vector (DV) are stored on the same storage node. This allows for parallelism in query processing.

Consider the following two table schema describing the tables T1 and T2.

T1 (A, B, C, D, E)
EDD: (A)
SG: SG1

| T2 (P, Q, R) |
|---|
| EDD: (P) |
| SG: SG1 |

For the purposes of this illustration, assume that columns A and P have identical data types. This implies that if a row in T1 has a row with A=14, then any row in table T1 with A=14 will be on the same storage node as the first row. Further, any row in T2 that has P=14 will also be on the same storage node as the rows in T1 with a value of A=14.

If the storage nodegroup SG1 has six nodes (Nodes 1 through 6), then the query

```
SELECT B, Q
FROM T1, T2
WHERE A = P;
``` could be executed completely in parallel, with each storage node performing the join based on the rows of table T1 and T2 that they hold because it can be guaranteed that the rows of T1 and T2 that can be joined (if they satisfy the condition T1.A=T2.P), will in fact be collocated on the same node.

FIG. 17 presents a schema represented in the standard Chen notation for Entity Relationship Diagrams, and the corresponding SQL DDL. Each PROJECT (1701) CONTAINS (1702) multiple QUOTATIONS (1703) and each QUOTATION HAS (1704) multiple ATTACHMENTS (1705). We know that each PROJECT CONTAINS multiple QUOTATIONS because in the Chen notation, the numbers "1" (1721) and "N" (1722) placed on either side of the CONTAINS relationship indicate this. Similarly, the "1" (1723) and "N" (1724) indicate that each QUOTATION HAS multiple ATTACHMENTS. The SQL DDL for this is shown on the right beginning with the DDL to create the PROJECT table (1711) defining the PROJECT_ID to be the PRIMARY KEY. This is followed by the DDL to create the QUOTATIONS table (1712) which includes the definition of QUOTATION_ID as its primary key, a column called PROJECT_ID and the FOREIGN KEY definition (1713) which indicates that the PROJECT_ID in the QUOTATIONS table references the PROJECT_ID in the PROJECTS table. Similarly the DDL to create the table ATTACHMENTS (1714) includes the FOREIGN KEY definition for QUOTATION_ID referencing QUOTATIONS (QUOTATION_ID).

It would be beneficial for the operation of the EPRDBMS if co-location of ATTACHMENTS data along with the QUOTATIONS data could be ensured. To achieve this, the QUOTATIONS table and the ATTACHMENTS table would have to be distributed according to some EDD on the QUOTATION_ID on the same Storage Group, or one of the two tables would have to be BROADCAST and the other could be EDD on the same Storage Group. However, it would be ideal if all three tables, PROJECT, QUOTATIONS, and ATTACHMENTS could be co-located for their respective joins on the foreign key relationships. In order to achieve this, the ATTACHMENTS table would have to be distributed according to the PROJECT_ID.

Normalization of the schema beyond the second normal form requires that the ATTACHMENTS table not contain the PROJECT_ID. This is also good practice to eliminate anomalies in the data model.

To achieve co-location of these three tables, the ATTACHMENTS data must be distributed according to the PROJECT_ID of its parent QUOTATION.

According to one aspect herein, a table can be defined to be distributed according to data not present in the tables' rows. This is achieved through an abstraction of a CONTAINER. According to this aspect, the Distribution Vector for a table may consist of some attributes that are not part of that table, or may even consist entirely of attributes that are not part of that table.

Accordingly, a CONTAINER is defined to include data for tables that must be co-located. FIG. 18 illustrates this with a system with four sites, site01 (1801), site02 (1802), site03 (1803), and site04 (1804). The schema contains four tables, PROJECT, QUOTATIONS, ATTACHMENT and ACCOUNTS. In this illustration the PROJECT table is defined as the CONTAINER BASE TABLE (CBT) and the data for the CBT is stored the four sites in the slices (1811), (1812), (1813) and (1814). The QUOTATIONS table is defined as a CONTAINER MEMBER TABLE (CMT), and the data for the CMT is stored on the four sites in slices (1821), (1822), (1823), and (1824). The ATTACHMENT table is defined as a CONTAINER MEMBER TABLE (CMT) and the data for the CMT is stored on the four sites in slices (1831), (1832), (1833), and (1834). Finally, the ACCOUNTS table is defined to be distributed according to the BROADCAST distribution model, and therefore four identical slices of data are stored in (1841), (1842), (1843), and (1844).

A CBT is a table that forms the basis of the CONTAINER based data distribution model. Data in that table is distributed using some distribution model on storage nodes that form part of an associated storage group. A CONTAINER ELEMENT (CE) is a row in the CBT. The CONTAINER DISTRIBUTION VECTOR (CDV) is the DV of the CE. A CONTAINER MEMBER TABLE (CMT) is a table that participates in container based data distribution according to some CBT. A client connection to the EPRDBMS has connection specific context, and one of those items of context is the CONTAINER CONTEXT (CC).

According to one aspect herein, data for a CMT shall be stored co-located along with the data for the appropriate data in the CBT, through the mechanism of CONTAINER BASED DATA DISTRIBUTION, and the extension of the definition of a DV of a table to include attributes that are not part of the table itself.

FIG. 19 provides an illustration of the DDL used in defining such a container based data distribution. A CONTAINER is defined first (1901) and a storage group (defaults) is associated with the CONTAINER. Step (1901) defines a container called pContainer. Next, the CONTAINER BASE TABLE (CBT) is defined in step (1902) and this table is defined to be distributed according to an EDD on the column (project_id) and the association with the container pContainer is established through the declaration "DISCRIMINATOR FOR CONTAINER pContainer". Steps (1903) and (1904) define CMT's QUOTATIONS and ATTACHMENT and their distribution as CMT's is defined in the declaration "CONTAINER DISTRIBUTE pContainer". Finally, a table ACCOUNTS is defined to be BROADCAST distributed on the storage group defaults.

According to one aspect of the EPRDBMS herein, each connection to the system has associated with it the Container Context (CC) for each container defined on the system. The CC for each container may be one of the NULL Context, the GLOBAL Context, the AUTOMATIC Context, or a specified Container Context.

We first describe the operation of the system in the NULL, GLOBAL and SPECIFIED Container Contexts, and then describe the AUTOMATIC Container Context which is a hybrid mode of operation that extends the other three contexts.

According to one aspect herein, when a system is operating in the NULL Context, the system operates in a manner that reflects that CBT's are distributed according to their stated distributions, and that all CMT's are random distributed on the storage group associated with their container. All tables not part of the container system are assumed to be distributed according to their stated distributions.

FIG. 20 shows the decisions that the DQP will make in each of the provided instances in the NULL Container Context (NULL-CC). FIG. 20 continues on the illustration in FIGS. 18 and 19. The first query (2001) provides an illustration of the mechanism to assign the NULL-CC as the current context with respect to the container pContainer. The next query (2002) selects all data from the PROJECTS table and the DQP determines that the query must be executed on sites site01, site02, site03 and site04. The next query (2003) joins the table PROJECTS with the table ACCOUNTS based on the ACCOUNT_ID column in both tables. As the table ACCOUNTS is broadcast distributed on the same storage group as the table PROJECTS, this join can continue completely in parallel as an identical copy of the data in the ACCOUNTS table found in each slice (1841), (1842), (1843), and (1844). The last query (2004) joins the table PROJECTS with the table QUOTATIONS based on the PROJECT_ID column in both tables. While QUOTATIONS is a CMT, and CONTAINER DISTRIBUTED according to pContainer, since the system is operating in the NULL Container Context (NULL-CC), the DQP does not recognize this fact. It therefore assumes that rows of data in PROJECTS and QUOTATIONS are not co-located for the purpose of this join.

FIG. 21 shows the decisions that the DQP will make in each of the provided instances in the GLOBAL Container Context (GLOBAL-CC). FIG. 21 is a continuation of the illustrations in FIGS. 18 and 19. The first query (2101) provides an illustration of the mechanism to assign the GLOBAL-CC as the current context with respect to the container pContainer. The next query (2102) selects all data from the PROJECTS table and the DQP determines that the query must be executed on sites site01, site02, site03 and site04. The next query (2103) joins the table PROJECTS with the table ACCOUNTS based on the ACCOUNT_ID column in both tables. As the table ACCOUNTS is broadcast distributed on the same storage group as the table PROJECTS, this join can continue completely in parallel as an identical copy of the data in the ACCOUNTS table is found in each slice (1841), (1842), (1843), and (1844). The last query (2104) joins the table PROJECTS with the table QUOTATIONS based on the PROJECT_ID column in both tables. As QUOTATIONS is a CMT, and CONTAINER DISTRIBUTED according to pContainer, since the system is operating in the GLOBAL Container Context (GLOBAL-CC), the DQP does in fact recognize this fact. It therefore assumes that rows of data in PROJECTS and QUOTATIONS are co-located for the purpose of this join.

FIG. 22 shows the decisions that the DQP will make in each of the provided instances in the Specified Container Context (SPECIFIED-CC). FIG. 22 is a continuation of the illustrations in FIGS. 18 and 19. The first query (2201) provides an illustration of the mechanism to assign the SPECIFIED-CC as the current context with respect to the container pContainer. This query assigns the current context with respect to pContainer to be (7). As illustrated in FIG. 18, project 7 is stored on site 02. Once the SPECIFIED-CC is established, the DQP will target future queries to any tables that are part of this pContainer context to only site02. The next query (2202) selects all data from the PROJECTS table and the DQP determines that the query must be executed on sites site02, only because it is operating in SPECIFIED-CC (7). The next query (2203) joins the table PROJECTS with the table ACCOUNTS based on the ACCOUNT_ID column in both tables. As the table ACCOUNTS is broadcast distributed on the same storage group as the table PROJECTS, this join can continue completely in parallel as an identical copy of the data in the ACCOUNTS table is found in each slice (1841), (1842), (1843), and (1844). However, as it is operating in SPECIFIED-CC (7), the query is only sent to site02. The last query (2204) joins the table PROJECTS with the table QUOTATIONS based on the PROJECT_ID column in both tables. As QUOTATIONS is a CMBT, and CONTAINER DISTRIBUTED according to pContainer; since the system is operating in the Specified Container Context (SPECIFIED-CC (7)), the DQP does in fact recognize this fact. It therefore assumes that rows of data in PROJECTS and QUOTATIONS are collocated for the purpose of this join and further restricts the query to site02, the site where the CDV directs it.

FIG. 22 illustrated one way to enter the SPECIFIED-CC. FIG. 23 illustrates another such mechanism. As illustrated there, query (2301) inserts a row into the PROJECTS table with a PROJECT_ID of 20. As PROJECTS is a CBT of pContainer this operation sets the system into the pContainer CC of SPECIFIED-CC (20). For the purposes of this illustration, assume that the EDD of the PROJECTS table determines that the row with PROJECT_ID=20 must be stored on site03. The next query (2302) inserts a row of data into the QUOTATIONS table. As the QUOTATIONS table is a CMT based on the pContainer container, the row is stored into the slice of the QUOTATIONS table on site03, the location identified by SPECIFIED-CC (20). Query 2303 inserts another row of data into the PROJECTS table causing it to transition to the SPECIFIED-CC (21). For the purposes of this illustration, assume that the EDD of the PROJECTS table determines that the row with PROJECT_ID=21 must be stored on site04. The following two INSERTS (2304), and (2305) will therefore be sent to the slice(s) of those two tables on site04.

In the case of more complex schemas it is possible that there may be multiple hierarchies such as the illustration in FIG. 24. In this illustration, tables C and D (2403) and (2404) are related by the relationship R (2413) and this is a many to many relationship. The tables C, B and A (2403), (2402) and (2401) have a hierarchical 1-N relationship as illustrated by the relationships Q (2412) and P (2411). Similarly the tables D, E and F (2404), (2405) and (2406) have a 1-N relationship as illustrated by the relationships S and T (2414), (2415). The equivalent DDL for this is illustrated on the right with statements (2421) through (2426) which create each of the tables A through F and define their key relationships.

The ER diagram and DDL as shown in FIG. 24 can be converted into a CONTAINER BASED distribution as illustrated in FIG. 25. Two containers, cContainer and dContainer are defined (2501), and (2502). For the purposes of illustration, cContainer was associated with the storage group sg1 and dContainer was associated with the storage group sg2. In practice, the two containers could have also been associated with the same storage group. The DDL statements (2503) through (2506) define the CMT's E, F, A and B respectively and the DDL statements (2507) and (2508) define the CBT's C and D respectively.

With this setup, queries that only reference tables in a single container, queries that reference only tables in the cContainer (A, B, C), or queries that reference only tables in the dContainer (D, E, F) are handled by the DQP in a manner analogous to the illustrations in FIGS. 20, 21, 22 and 23 and as described above.

According to one aspect herein, a connection to the EPRDBMS can have a CC relative to the cContainer and a CC relative to the dContainer and this CC is stored in the connection state associated with the connection. When a query is received by the EPRDBMS on this connection, references to tables in each container group (in the illustration of FIGS. 24 and 25 that is cContainer group consisting of table A, B, C and dContainer group consisting of D, E, F) are planned based on their respective container context.

FIGS. 26 and 27 provides some examples of this. The two queries (2601) in FIG. 26 establish the NULL-CC for cContainer and dContainer and (2602) performs a join of tables B, C, D, and E. Since the NULL-CC has been established for both containers, the DQP concludes that the join between B and C, and the join between D and E are not collocated. The query plan generated for this query would therefore require the redistribution of B and C to perform the join between them, the redistribution of C and D to perform the join between them, and the redistribution of those two results to perform the join between C and D. The query (2603) establishes NULL-CC for the cContainer, but a specified-cc for the dContainer and issues the query (2604). Accordingly, the DQP will assume that tables B and C are not co-located for the join, but that tables D and E are not only co-located for the join, but the join between D and E is further restricted to the node (in sg2), where the value DID=14 resides. Query (2701) establishes the specified-cc for both containers and then issues the query (2702). The DQP will assume that tables B and C are co-located for the join and further restrict the join to the storage node (in sg1), where the value of CID=16 resides. The DQP will also assume that the tables D and E are co-located for the join and further restrict the join to the storage node (in sg2), where the value of DID=19 resides. Finally query (2703) establishes the GLOBAL-CC on the cContainer and the specified-cc on the dContainer. When query (2704) is issued, the DQP assumes that tables B and C are co-located for the join and performs the join between them on all nodes in sg1 (global-cc). Further, it assumes that tables D and E are co-located for the join and restricts the join to the node of sg2, where the value DID=19 resides. As the query further specifies DID=19 as a restriction, other values of DID that reside on this node are excluded from the result set.

According to this aspect of the system, the container context for each container on the system can be changed independently, and without any impact on the other container contexts associated with the connection.

According to another aspect of the system, all queries (and not just SELECT's as illustrated above) accessing data in tables participating in a container are restricted based on the established container context.

According to a further aspect herein, the system supports a mechanism for relocation of a row in the CBT. To accomplish this, and maintain co-location of data, one must also relocate all data in CMT's that correspond to the row in the CBT being relocated.

According to another aspect, the AUTOMATIC Context is a hybrid context where the system may either operate in the NULL Context or the GLOBAL Context for all queries manipulating existing data, and performs automatic detection of context for insertions into the CBT as described above, and further performs automatic detection of context of the SPECIFIED-CC for addition of data into CMT's.

We now describe the aspects of the system relating to the automatic detection of SPECIFIED-CC for addition of data into CMT's.

Consider the relationships between the tables PROJECT, QUOTATIONS, and ATTACHMENTS described in FIG. 17, and above, and the CONTAINER based representation in FIGS. 18 and 19 that are described above. Further assume that the system is operating in the AUTOMATIC-CC established as below.

USING CONTAINER pContainer (AUTOMATIC);

Now assume that a user inserted a row into the table QUOTATIONS as illustrated in FIG. 28. The INSERT statement itself is shown on FIG. 28 as (2801). The process of performing the INSERT is described below and starts at step 2801. A valid INSERT statement has been received and the DQP process first inspects the statement to determine whether the insertion is into a CMT or not (2802). If not then the row will be dispatched to its correct storage node based on the rules for a non-container based table or CBT as appropriate (2803). On the other hand, if it is found to be a CMT, the system will verify whether a valid DISPATCHING RULE (dispatching rules are described in the following sections) is found (2804) and if not, an error is generated (2805). If a dispatching rule is found, then the row is sent to the storage node indicated by that rule.

As described above, the system relies on a DISPATCHING RULE to determine where to send data during AUTOMATIC-CC operation when an insertion is performed in a CMT. According to one aspect herein, the EPRDBMS defines an extension to the DDL syntax for table creation that allows for the definition of dispatching rules. According to one aspect, these dispatching rules may be specified in-band or out-of-band (out-of-band definitions are described in detail starting in paragraph [124] below). According to another aspect, the EPRDBMS defines an extension to the syntax of the SQL statement to allow for the definition of a dispatching rule for the row(s) being inserted.

A foreign key relationship is a simple example of a dispatching rule. Consider again the example of FIG. 28, and the DDL for the various tables involved as described in FIG. 17. The DDL for the QUOTATIONS table included the following FOREIGN KEY (PROJECT_ID) REFERENCES PROJECT (PROJECT_ID);

In a container based distribution such as this one, the row in the QUOTATIONS table should be co-located with the row in the PROJECTS table.

In the illustration in FIG. 28, the insert statement (2801) identifies the PROJECT_ID 19 and the EPRDBMS can use this information to determine that the row being inserted must be placed on the same storage node where the row with project_id 19 resides. Referring back to FIG. 18, we see that the project_id 19 resides on site04 (1804) as depicted by the project_id's shown in the slice of the project table on that site (1814).

Accordingly therefore, the EPRDBMS can dispatch the subject row being inserted into the QUOTATIONS table to site04.

FIG. 29 extends on the illustration in FIG. 28 and shows the operation of the system in AUTOMATIC-CC when a row of data is inserted into the ATTACHMENTS table. The row being inserted is shown (2901) and the row references QUOTATION_ID 74. The DQP inspects the query to determine whether the table is a CMT (2902). If the table is not a CMT, processing would have resumed at 2903 but since ATTACHMENTS is a CMT, processing resumes at 2904. As a FK relationship is found, no error (2905) is generated and processing resumes at 2906.

As the dispatching rule is a FK, the system inspects the FK.

```
FOREIGN KEY (QUOTATION_ID)
REFERENCES QUOTATIONS (QUOTATION_ID);
```

As the QUOTATION_ID is 74 (the same QUOTATION_ID inserted in FIG. 28), the system determines that the QUOTATION_ID is valid and dispatches this row to site04, the location where the QUOTATIONS row was dispatched in FIG. 28.

According to one aspect, the EPRDBMS supports extensions to the INSERT SQL syntax to allow for the definition of a dispatching rule if an FK relationship is not found. One situation where an FK relationship is not sufficient for the definition of a dispatching rule is the case of a polymorphic schema.

FIG. 30 provides an illustration of one such situation that cannot be represented using the standard SQL FK relationship. A PROJECT (3001) CONTAINS (3002) many INVOICES (3003), QUOTATIONS (3004), REPORTS (3005), PLANS (3006), or COMPLAINTS (3007), each of which HAS (3008) many ATTACHMENTS (3009). In this situation, the standard SQL grammar allows for the definition of the CONTAINS relationship as a FK relationship in the various tables INVOICES, QUOTATIONS, REPORTS, PLANS and COMPLAINTS but does not have a mechanism for defining the relationship HAS between ATTACHMENTS and these same tables and this is depicted in FIG. 30 by showing dotted lines between HAS (3008) and the respective tables while the FK relationships to the PROJECT table through CONTAINS are shown as solid lines.

FIG. 31 illustrates the schematic representation of this using SQL extensions provided by the EPRDBMS described herein. The definition of the container, the CBT and the tables QUOTATIONS, REPORTS, INVOICES, PLANS and COMPLAINTS is shown (3101). The extension related to the POLYMORPHIC KEY is shown in 3102 in the definition of the table ATTACHMENT. In this illustration, two columns rel_type and rel_id are used, and a rule (a_rule) is shown. The dispatching rule for this table is therefore

```
POLYMORPHIC KEY a_rule (rel_type, rel_id)
CONTAINER DISTRIBUTE pContainer
```

FIG. 32 shows an illustration of the polymorphic key a_rule referenced in (3102). The definition begins with the SQL DDL extension "CREATE POLYMORPHIC KEY" which defines a rule (3201) and indicates that a_rule has two parameters called TYPE and ID. When the TYPE has the value of 'QUOTATIONS' (3202) then the POLYMORPHIC KEY becomes a FK relationship to the table QUOTATIONS (3203 and 3204). Similarly when the TYPE has the values INVOICES, PLANS, COMPLAINTS or REPORTS, the POLYMORPHIC KEY becomes the FK relationships to the appropriate table(s) as in (3205, 3206, 3207 and 3208).

When operating in the AUTOMATIC-CC, if a row were inserted into the table with the value of rel_type='COMPLAINTS', then the dispatching rule would use the polymorphic key a_rule to determine that the rel_id provided in the insert is to be treated as an FK relationship to the COMPLAINTS table and the row would be dispatched according to the location of the row in the COMPLAINTS table with that same id.

Redistribution Reduction in EPRDBMS

Summary: Parallel Database Management Systems provide the benefits of parallelism by distributing data and processing onto a plurality of processing nodes and having each node process the subset of data stored thereon. Optimum data placement (called data distribution) is important in making this possible. Not all queries that are presented to the system can operate optimally because a data distribution for one set of queries may turn out to be sub-optimal for another set of queries. In order to process queries it is sometimes required that data from multiple nodes be brought together first and in parallel database management systems this operation is often referred to as redistribution. Redistribution reduces the benefits of parallelism and therefore a reduction of the amount of data being redistributed is vital to the efficient operation of a parallel database management system. Methods and techniques for reducing data redistribution are presented.

As an EPRDBMS distributes data for user tables across a plurality of Storage Nodes, and Parallelism is achieved by having the EPRDBMS generate Query Execution Steps (QES) that are executed in a specified sequence on a specified node (Storage Node or Compute Node, for example) or nodes, in parallel and at the same time, it also defines mechanisms for data distribution (such as Elastic Data Distribution) to ensure the co-location of data. When two tables are joined in a SQL query and the data for the tables is co-located for the join, the join operation can perform in parallel on the storage nodes. However, if the data is not co-located for the join, then the DQP process will introduce redistribution operations on the incoming streams to the join, to ensure that the data being joined is in fact co-located for the purpose of the join.

An aspect of the EPRDBMS is the use of Compute Nodes as an elastic resource to facilitate these kinds of operations requiring data redistribution.

Assume that two tables T1 and T2 are joined in a query such as this one below.

```
SELECT T1.A, T2.B
FROM T1, T2
WHERE T1.X = T2.Y;
```

Assume further that T1 and T2 are not distributed in a manner that is co-located for the purposes of the join (T1.X=T2.Y). This may be for one of many reasons, such as that T1 and T2 are not on the same Storage Group, or that one of T1 or T2 is distributed according to a random distribution, and so on. In order to execute this query, the EPRDBMS must perform a redistribution operation to generate copies of the data required for the join, where the join can be performed in parallel on some collection of nodes (Storage Nodes or Compute Nodes), that are part of the system.

FIG. 33 illustrates one possible plan (QES) for the query shown in [198] above.

The first REDISTRIBUTE operation (3301), performs some deterministic computation on (X) and redistributes the data in table T1 (columns A and X) onto the various nodes (compute nodes) in the DEFAULT-COMPUTE nodegroup, associated with the connection. The second REDISTRIBUTE operation (3302) performs some deterministic computation on (Y), and redistributes the data in table T2 (columns B and Y) onto the various nodes (compute nodes) in the DEFAULT-COMPUTE nodegroup, associated with the connection. The third EXECUTE operation (3303) then performs the join between TEMP1 and TEMP2 that were created in the above two operations, and on the default compute nodegroup associated with the connection. Since the REDISTRIBUTE operations determined where (on which compute node in the default compute nodegroup) to place each row from tables T1 and T2 based on a deterministic operation performed on X and Y (the join columns), it can be guaranteed that any row in T1 with a value of X that matched some row in T2 with the same value of Y would be such that the two rows would be on the same compute node.

Assume that table T1 has 100 rows, and the possible values of X range between 1 and 100, and further assume that table T2 has 100,000 rows and the possible values of Y range between 1 and 100,000. According to the QES provided above, the EPRDBMS would redistribute 100 rows (from T1) into the nodes on the compute nodegroup associated with the connection, and then proceed to redistribute 100,000 rows of data (from T2) into the nodes on the compute nodegroup associated with the connection. In total, this would result in a redistribution of 100,100 rows of data into the compute group. Then the join would be executed and would not use the rows from TEMP2 with values of Y between 101 and 100,000 because no rows in TEMP1 have a corresponding value of X. The cost of redistribution of this unused data includes the cost of unnecessarily reading of the data from table T2, the cost of moving the data from its storage node of origin to the compute node in the default compute nodegroup, the cost of storing it on the compute node, and the cost of then reading that data as part of the join between TEMP1 and TEMP2.

According to one aspect of the EPRDBMS herein, the amount of data redistributed as part of query processing (not necessarily just joins, though joins have been used in the illustration above) is materially reduced through the use of redistribution-inclusion-lists. According to this aspect, and further using the example provided above, during the first REDISTRIBUTE operation on table T1, the EPRDBMS constructs a list of values of T1.X that were redistributed into the compute nodegroup and this list is then used to augment the second REDISTRIBUTE operation to ensure that only those values of T1.X which were seen in the first redistribution are now redistributed into TEMP2.

Accordingly, FIG. 34 illustrates the query execution steps for this plan.

Observe that the first REDISTRIBUTE operation (3401) generating TEMP1 from table T1 also produces the INCLUSION-LIST called LIST-X which is then used to restrict the values from table T2 that are REDISTRIBUTED as part of the second operation (3402).

FIG. 35 illustrates another perfectly viable plan for executing this query. The first redistribute operation (3501) materializes TEMP2 and produces the INCLUSION LIST that can then be used in the second redistribute operation (3502) that produces TEMP1 which would then be followed by the join between TEMP1 and TEMP2 (3503) that produces the results of the query as expected by the user.

However, LIST-Y would include 100,000 values and in generating LIST-Y, the whole table would have been redistributed thereby providing no benefit.

One aspect of the EPRDBMS is that the DQP uses historical data and heuristics to determine the sequence in which to perform the steps in the QES (if multiple orderings are possible) in order to generate the sequence that is most efficient, and this includes the optimization of the order of steps to produce the most effective INCLUSION LISTS.

The INCLUSION LIST is generated during an operation that processes data, and may be generated either by the nodes originating the data or the nodes that are consuming the data.

In the example above, assume that the table T1 is on storage group SG1consisting of nodes N1, N2 and N3, and further that the compute nodegroup associated with the connection is CN consisting of nodes N4, N5, N6 and N7.

When the Query Execution Step (below) is executed, data on storage nodes N1, N2 and N3 are read and redistributed to N4, N5, N6 and N7.

```
REDISTRIBUTE INTO TEMP1 (A, X)
    ONTO DEFAULT-COMPUTE (X)
GENERATE INCLUSION-LIST (X) AS LIST-X
SELECT A, X FROM T1;
```

As rows of data are received by nodes N4 . . . N7, they can each generate a list of values of X that were received by them, and upon notification that all data from T1 has been read and redistributed, the nodes N4 . . . N7 can each send the list of values of X that they received to the Query Execution Engine for inclusion in the subsequent step that scans T2.

Equally, nodes N1, N2 and N3 can generate a list of values of X that they are redistributing, and when they have completed scanning their slice of table T1, they can send their part of the inclusion list to the Query Execution Engine for inclusion in the subsequent step that scans T2.

The EPRDBMS thus implements both of these mechanisms for the generation of the INCLUSION LIST, where it is generated by the originator or where it is generated by the receivers.

Broadly speaking, an INCLUSION LIST is a data structure used by the EPRDBMS that is generated in one step in the QES and used to augment a subsequent step in the QES with additional filtering that will serve to reduce the overall cost of the query execution by identifying rows that should be processed further, and those rows that need not be processed further.

The operation utilizing the INCLUSION LIST may utilize the list directly as a filter in the SQL sent to the database on the target nodes where the query execution step is being executed, or as a filter applied by the Query Execution Engine as part of the subsequent processing of the data by the EPRDBMS.

The data structure used to implement an INCLUSION LIST may be a simple list, enumerating all values that are part of the list. When there are a large number of entries in the list, it may be more efficient to use some other data structure than a list. One such mechanism to generate an INCLUSION LIST is through the use of a bitmap where each bit in the bitmap represents some value to include in the list.

For example, assume that the values in an inclusion list were integers in the range 1 to 1000, a bitmap of 1000 bits could be used where the i'th bit represented the value (i).

According to one aspect herein, an INCLUSION LIST may include 'false-positives' but never include 'false-negatives'. In other words, an INCLUSION LIST that specifies more values than required is sub-optimal but perfectly functional. However an INCLUSION LIST that fails to include some values is not permissible.

According to this aspect, an INCLUSION LIST may be a bitmap of some size (N). When a value of 'x' needs to be added to the list, a deterministic hash (CRC, for example) of x is first computed and then the Modulus operation is used to reduce the value of HASH(x) to a value in the range of [0, N−1] and that bit in the bitmap is used to represent the value 'x'. The bit may be determined by a formula such as:

$$\text{MODULUS (HASH}(x), N)$$

When using this method, an initial INCLUSION LIST consisting of N bits is initialized to include all bits of some initial value. To record the inclusion of a particular value in the bitmap, the bit corresponding to the value (as determined above) is set to the non-initial value.

Once all values of the list have been set in the bitmap, it can be used in a subsequent step in the QES to determine whether a particular value should be processed further or not as follows. For example, assume that the value 'y' is being evaluated. We first compute MODULUS (HASH(y), N) and determine whether the corresponding bit is set to the non-initial value. If it is, then that value may have been encountered during the creation of the list and appropriate actions can be taken.

One useful attribute of this mechanism of computing the INCLUSION LIST is that it can be computed in parallel by multiple nodes, and then combined by the Query Execution Engine to generate the final inclusion list.

According to one aspect, the inclusion list is computed by the receiver nodes of the data. As illustrated above, nodes N4, N5, N6 and N7 would maintain lists as they received data from nodes N1, N2 and N3 as part of the redistribution of table T1. By prior agreement, nodes N4 ... N7 would use a bitmap of N bits with a common initial value (say 0) and set some of the bits in the bitmap to 1 based on the rows of data that they received, and as described above. When all data has been received, they each send their bitmaps to the Query Execution Engine. Assume that these bitmaps are B4, B5, B6 and B7 respectively. The Query Execution Engine computes the INCLUSION LIST bitmap B, a bitmap of N bits as follows:

$$B = B4 | B5 | B6 | B7$$

where "|" is the bitwise OR operation

Therefore bit (i) in the bitmap B will be set to the value of 1 if and only if it was set to 1 in one of the bitmaps B4, B5, B6 or B7.

According to one aspect, the data structure maintained by each of the nodes generating a portion of the INCLUSION LIST based on the data they process may not be amenable to this simple mechanism for consolidation. In that case, the data structure generated by the Query Execution Engine may be merely a reference to the individual data structures generated. Using the illustration above, if nodes N4 ... N7 generated some data structures DS4, DS5, DS6 and DS7, the Query Execution Engine may generate the INCLUSION LIST merely as (DS4, DS5, DS6, DS7). When a subsequent step wishes to use this list, it would determine whether a given value was seen during the generation of the list by following the same steps that were used by nodes N4 ... N7 in encoding the data structure and then sequentially inspecting the data structures DS4 ... DS7 till a positive indication is found that the subject value was seen in the preceding step.

According to another aspect herein, the INCLUSION LIST may be constructed as follows. Each of the participating slices generates M bitmaps, each with $N_i$ bits. For each value x that they encounter, they set multiple bits as follows:

In the i'th Bitmap (called $b_i$) set the bit corresponding to

MODULUS (HASH$_i$(x), N$_i$)

where $N_i$ is the size of the i'th bitmap.

In this scheme with M bitmaps, M different hashing algorithms are used. It is not necessary that these be M distinct hashing algorithms but if HASH$_i$ is the same as HASH for some values i, and j, then it is required that $N_i \neq N_j$. Assuming that there are 'l' nodes numbered 1 through 'l', then the INCLUSION LIST computed by the Query Execution Engine shall be computed as follows $$B_i = b_{i1} | b_{i2} | b_{i3} \ldots b_{il}$$

Where '|' is the logical OR operator, and $b_{ij}$ is the i'th bitmap from node 'j'

And the INCLUSION LIST shall consist of $$(B_1, B_2, \ldots B_l)$$

According to another aspect herein the data structure used to generate the inclusion list may be a bitmap with N bits, and where each of the generating nodes produced a bitmap with N bits as follows. For each observed value that is to be included in the list, multiple bits are set in the bitmap. Assume that 'm' hashes are used, then the occurrence of a single value in the list would be recorded by setting the following bits.

MODULUS(HASH$_i$(x), N)

The Query Execution Engine would consolidate the bitmaps received from each of the 'l' participating nodes and generate a single bitmap B as $$B = B_1 | B_2 | B_3 \ldots | B_l$$

Through the use of INCLUSION LISTS, the EPRDBMS herein reduces the amount of data that must be processed. It finds application in a wide variety of queries including (but not limited to) joins, aggregations and sorting.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

The invention claimed is:

1. A database management system comprising:
   a) a network interface, for receiving database queries from two or more client applications, the client applications operating on two or more user client computers, providing at least one connection into the system for each such client application;
   b) a group of two or more operational nodes for executing the queries as database operations, each operational node implemented as a logical collection of software components that execute on one or more physical machines;
   c) one or more operational nodes being designated as storage nodes;
   d) one or more storage nodes grouped into storage nodegroups wherein the system is further configured and operates such that
   e) client applications establish connections with the system and interact with the system in a query language;
   f) user data is stored in tables, and tables are grouped into databases;
   g) tables are associated with storage nodegroups, and wherein data for a given table is stored on the storage nodes that are part of the storage nodegroup associated with the given table;
   h) data in tables is distributed across the various nodes in the associated storage nodegroups based on various data distribution methods wherein some data distribution methods are data dependent where each node contains a horizontal partition of the data in the table and where the nodes in the storage nodegroups collectively have all the data for the table, and wherein other data distribution methods are data independent distribution methods where each node contains some or all of the data in the table;
   i) a row of data in a table distributed according to a data dependent distribution is stored on a node based on a value of a distribution vector (DV) which may consist of columns in the row, or attributes that are not columns of the row, or determined based on the values of some columns of the row;

j) two or more rows in a single table with identical distribution vectors are stored on the same storage node achieving co-location of data in the two or more rows;

k) two or more rows in two tables associated with the same storage nodegroup and having identical distribution vectors are stored on the same storage node achieving co-location of data in the two or more rows in two tables associated with the same storage nodegroup;

l) one or more tables are defined as Container Base Tables (CBT's) and whereby the values of specified columns in the CBT defined as the DV of the CBT are used as the DV for all other tables that are defined to be Container Member Tables (CMT) controlled by the subject CBT;

m) rows in the CMT are stored on the storage node based on their DV, which is the DV of a uniquely determined row in the CBT thereby achieving co-location of data in the CMT with the corresponding row of the CBT; and n) whereby when a table is defined as a CBT a named container is established, and whereby other tables may be defined to be CMT's that are part of the named container.

2. The system of claim 1 further operating with multiple containers at the same time.

3. The system of claim 1 further operating in different Container Contexts with respect to each named container, including a NULL Context (NULL-CC), a Global Context (Global-CC), and/or a Specified Context (Specified-CC).

4. The system of claim 1 wherein a persistent state is associated with each connection established by a client application with the system, and the container context with respect to each container is associated with each connection as part of the persistent connection state associated with the connection.

5. The system of claim 1 further wherein a client application connects to the system to establish the container context relative to a specified named container through the use of a query language command.

6. The system of claim 3 further wherein o) the system operates in a Specified-CC context with respect to a specific named container through the specification of the DV of the CBT that should be associated with the connection;

p) in a NULL-CC, a Dynamic Query Planner (DQP) behaves as though CBT's are distributed according to their specified DV and all CMT's that are members of the named container associated with the CBT are randomly distributed on the same nodegroup associated with the CBT;

q) in a Global-CC, the DQP behaves as though all rows that are stored in tables that form part of the same named container, including all rows in the CBT and the CMT's are co-located for the purposes of query planning; and r) in a Specified-CC, the DQP behaves as though all rows that are stored in tables that form part of the same named container, including all rows in the CBT and the CMT's are co-located for the purposes of query planning and operations are restricted to the storage node that holds the row with the DV associated with the Specified-CC.

7. The system of claim 1 whereby the distribution vector of a row of data in a table is the distribution vector of a uniquely determined row in another table related to the subject row through a defined relationship between the tables.

8. The system of claim 3 wherein the Container Contexts further include an Automatic Container Context (Automatic-CC), whereby when in Automatic-CC, a Dynamic Query Planner (DQP) handles insertions into a CMT by following the defined relationship of a candidate row and locating the storage node where the corresponding row in the target table of the defined relationship is stored, and storing the candidate row on the same storage node.

9. The system of claim 7 whereby the defined relationship is a foreign key relationship between the two tables.

10. The system of claim 1 that allows for definition of a polymorphic key where a polymorphic key relationship establishes a relationship between a row in a first table to exactly one uniquely determined row in one of many possible other tables based on the values in columns of a subject row, and using some specified rules, and expressed in some suitable language, or some other mechanism, and whereby the distribution vector of a row of data in the first table is the distribution vector of that uniquely determined row in the other table.

11. The system of claim 1 whereby a row in a CBT may be relocated from one storage node in the nodegroup associated with the table to another storage node in the nodegroup associated with the table, and where such relocation of a row in the CBT causes relocation of all rows in the CMT's that are related to the subject CBT.

12. The system of claim 7 that provides for definition of a polymorphic key wherein a polymorphic key relationship establishes a foreign key relationship between a row in the first table and a uniquely determined row in one of many possible other tables based on the values in columns of the subject row and using the specified rules.

13. The system of claim 1 whereby a mechanism for definition of a polymorphic key where a polymorphic key relationship establishes a relationship between a row in a first table to a uniquely determined row in one of many possible other tables based on the values in columns of a subject row, and using some specified rules;

where the values in columns of one row in one table are used in evaluation of the specified rules, and to determine the table to which a polymorphic key relationship exists for a specified row in the first table; and where the polymorphic key relationship and the specified rules are expressed in some suitable language.

14. A method for operating a database management system comprising:

a) receiving database queries from two or more client applications via a network interface, the client applications operating on two or more user client computers, the network interface providing a least one connection for each such client application;

b) executing the database queries as database operations on a group of two or more operational nodes, each operational node implemented as a logical collection of software components that execute on one or more physical machines;

c) operating other nodes as storage nodes for storing data;

d) grouping one or more storage nodes into storage nodegroups, e) interacting with client applications in a query language;

f) storing user data in tables, and grouping the tables into databases;

g) associating the tables with storage nodegroups, wherein data for a given table is stored on the storage nodes that are part of the storage nodegroup associated with the given table;

h) distributing data in tables across the various nodes in the associated storage nodegroups based on various data distribution methods wherein some data distribution methods are data dependent where each node contains a horizontal partition of the data in the table and where the nodes in the storage nodegroups collectively have all the data for the table, and wherein other data distribution methods are data independent distribution methods where each node contains some or all of the data in the table;

i) distributing a row of data in a table to the storage nodes according to a data dependent distribution based on a value of a distribution vector (DV) which may consist of columns in the row, or attributes that are not columns of the row, or determined based on the values of some columns of the row;

j) storing two or more rows in a single table with identical distribution vectors on the same storage node thereby achieving co-location of data in the two or more rows;

k) storing two or more rows in two tables associated with the same storage nodegroup and having identical distribution vectors on the same storage node thereby achieving co-location of data in the two or more rows in two tables associated with the same storage nodegroup;

l) defining one or more tables as Container Base Tables (CBT's) whereby the values of specified columns in the CBT defined as the DV of the CBT are used as the DV for all other tables that are defined to be Container Member Tables (CMT) controlled by the subject CBT;

m) storing rows in the CMT on the storage node based on their DV, which is the DV of a uniquely determined row in the CBT thereby achieving co-location of data in the CMT with the corresponding row of the CBT; and n) establishing a named container when a table is defined as a CBT, and whereby other tables may be defined to be CMT's that are part of the same named container.

15. The method of claim 14 further comprising operating with multiple containers at the same time.

16. The method of claim 15 further operating in different Container Contexts with respect to each named container, including a NULL Context (NULL-CC), a Global Context (Global-CC), and/or a Specified Context (Specified-CC).

17. The method of claim 16 additionally comprising:
associating a persistent state with each connection established by a client application, wherein the container context with respect to each container is associated with each connection as part of the persistent connection state associated with the connection.

18. The method of claim 17 further comprising:
establishing the container context relative to a specified named container through the use of a query language command.

19. The method of claim 17 further wherein o) operating in a Specified-CC context with respect to a specific named container through the specification of the DV of the CBT that should be associated with the connection;

p) in a NULL-CC, a Dynamic Query Planner (DQP) behaving as though CBT's are distributed according to their specified DV and all CMT's that are members of the named container associated with the CBT are randomly distributed on the same nodegroup associated with the CBT;

q) in a Global-CC, the DQP behaving as though all rows that are stored in tables that form part of the same named container, including all rows in the CBT and the CMT's are co-located for the purposes of query planning; and r) in a Specified-CC, the DQP behaving as though all rows that are stored in tables that form part of the same named container, including all rows in the CBT and the CMT's are co-located for the purposes of query planning and operations are restricted to the storage node that holds the row with the DV associated with the Specified-CC.

20. The system of claim 15 whereby the distribution vector of a row of data in a table is the distribution vector of a uniquely determined row in another table related to the subject row through a defined relationship between the tables.

21. The method of claim 17 wherein the Container Contexts further include an Automatic Container Context (Automatic-CC), whereby when in Automatic-CC, a Dynamic Query Planner (DQP) handles insertions into a CMT by following a defined relationship of a candidate row and locating the storage node where the corresponding row in the target table of the defined relationship is stored, and storing the candidate row on the same storage node.

22. The method of claim 21 whereby the defined relationship is a foreign key relationship between the two tables.

23. The method of claim 15 further comprising:
defining a polymorphic key including a polymorphic key relationship for establishing a relationship between a row in a first table to exactly one uniquely determined row in one of many possible other tables based on the values in columns of a subject row, and using some specified rules, and expressed in some suitable language, or some other mechanism, and whereby the distribution vector of a row of data in the first table is the distribution vector of that uniquely determined row in the other table.

24. The method of claim 15 whereby a row in a CBT may be relocated from one storage node in the nodegroup associated with the table to another storage node in the nodegroup associated with the table, and where such relocation of a row in the CBT causes relocation of all rows in the CMT's that are related to the subject CBT.

* * * * *